United States Patent
Shevelow et al.

(10) Patent No.: US 10,900,859 B2
(45) Date of Patent: Jan. 26, 2021

(54) CONDUCTIVE FLUID SENSOR CABLE

(71) Applicant: Pica Product Development, LLC, Derry, NH (US)

(72) Inventors: Richard Shevelow, Estero, FL (US); Scott Stapleford, Londonderry, NH (US); Patrick Walsh, Allenstown, NH (US)

(73) Assignee: PICA Product Development, LLC, Derry, NH (US)

(*) Notice: Subject to any disclaimer, the term of this patent is extended or adjusted under 35 U.S.C. 154(b) by 0 days.

(21) Appl. No.: 16/516,077

(22) Filed: Jul. 18, 2019

(65) Prior Publication Data

US 2020/0393321 A1 Dec. 17, 2020

Related U.S. Application Data

(60) Provisional application No. 62/862,005, filed on Jun. 14, 2019.

(51) Int. Cl.
*G01M 3/16* (2006.01)
*H01B 7/04* (2006.01)

(52) U.S. Cl.
CPC .............. *G01M 3/165* (2013.01); *H01B 7/04* (2013.01)

(58) Field of Classification Search
CPC .................................. G01M 3/165; H01B 7/04
See application file for complete search history.

(56) References Cited

U.S. PATENT DOCUMENTS

| | | | |
|---|---|---|---|
| 3,612,744 A | 10/1971 | Thomas | |
| 3,939,558 A * | 2/1976 | Riley | H05K 1/167 29/832 |
| 4,025,896 A * | 5/1977 | Hintze | B60K 35/00 362/253 |
| 4,082,402 A | 4/1978 | Kinkaid et al. | |
| 4,374,379 A | 2/1983 | Dennison, Jr. | |
| 4,843,305 A | 6/1989 | Akiba | |
| 4,900,268 A | 2/1990 | Kunishi | |
| 6,089,904 A | 7/2000 | Wu | |
| 6,144,209 A | 11/2000 | Raymond et al. | |
| 6,175,310 B1 | 1/2001 | Gott | |
| 6,443,758 B2 | 9/2002 | Nagai | |
| 6,505,509 B2 | 1/2003 | Gualtieri | |

(Continued)

FOREIGN PATENT DOCUMENTS

CN 203277846 U 11/2013
CN 204313883 U 5/2015

(Continued)

OTHER PUBLICATIONS amazon.com, Feb. 28, 2020 amazon.com/shop search results from search query "water leak sensor cable", retrieved Feb. 28, 2020, https://www.amazon.com/s?k=water+leak+sensor+cable&ref=nb_sb_noss_1, www.amazon.com, USA.

(Continued)

*Primary Examiner* — Daniel S Larkin
*Assistant Examiner* — Anthony W Megna Fuentes

(57) ABSTRACT

A conductive fluid sensor cable capable of manufacture in long lengths comprising a flexible substrate, a pair of conductors, and a cover material arranged to allow a conductive fluid path between the conductors when conductive fluid contacts the cable.

15 Claims, 15 Drawing Sheets

(56) References Cited

U.S. PATENT DOCUMENTS

| | | | |
|---|---|---|---|
| 6,526,807 | B1 | 3/2003 | Doumit et al. |
| 7,292,155 | B2 * | 11/2007 | Vokey .................. E04D 13/006 340/602 |
| 7,295,126 | B2 | 11/2007 | Stackelhouse |
| 7,338,310 | B2 | 3/2008 | Kumakura |
| 8,262,250 | B2 | 9/2012 | Li et al. |
| 8,714,772 | B1 | 5/2014 | Levante et al. |
| 8,872,032 | B2 | 10/2014 | Lin et al. |
| 9,910,003 | B1 * | 3/2018 | Lastinger .............. G01N 27/121 |
| 2001/0035048 | A1 | 11/2001 | Gualtieri |
| 2006/0244616 | A1 * | 11/2006 | Hill ........................ G01M 3/045 340/604 |
| 2006/0286848 | A1 | 12/2006 | Kumakura |
| 2013/0069675 | A1 | 3/2013 | Woloszyk |
| 2013/0300431 | A1 * | 11/2013 | Beinhocker .......... G02B 6/4469 324/539 |
| 2017/0003192 | A1 | 1/2017 | Ling et al. |

FOREIGN PATENT DOCUMENTS

| | | |
|---|---|---|
| CN | 206504834 U | 9/2017 |
| CN | 207069116 U | 3/2018 |
| CN | 207303424 U | 5/2018 |
| EP | 1524726 A1 | 4/2005 |
| EP | 1533871 A2 | 5/2005 |
| JP | 7-23514 A | 6/1993 |
| JP | H09115573 A | 5/1997 |
| JP | H09293571 A | 11/1997 |
| JP | 4090060 B2 | 5/2008 |
| JP | 4098290 B2 | 6/2008 |
| KR | 100424843 B1 | 3/2004 |
| KR | 20100138523 A | 12/2010 |

OTHER PUBLICATIONS

Aqualeak, "Water leak detection accessories", 2020, https://www.aqualeak.com/44/water-leak-detection-accessories/, Aqualeak Detection Ltd, Chippenham, Wiltshire, UK.

bing.com, Feb. 28, 2020 bing.com/shop search results from search query "water leak sensor cable", retrieved Feb. 28, 2020, https://www.bing.com/shop?q=water+leak+sensor+cable&FORM=SHOPTB, www.bing.com, USA.

Dorlen Products, "Instructions for Sensor Cable Models SC-12, SC-24, SC-36", May 2012, M-9946, Milwaukee, WI USA.

Envirotech Alarms, Ltd, "Leak-Stop Specification: Single Zone Water Leak Detection Alarm", Sep. 2019, V4.0.cdr, https://www.envirotechalarms.com/wp-content/uploads/2019/09/LeakStop-Specification-V4.1.pdf, Envirotech Alarms, Ltd., Devizes, Wiltshire, England.

google.com, Feb. 28, 2020 google.com shopping tab search results from search query "water leak sensor cable", retrieved Feb. 28, 2020, https://www.google.com/search?q=water+leak+sensor+cable&source=lnms&tbm=shop&sa=X&ved=2ahUKEwiokoPGw5_oAhUQhXIEHfP3Dd8Q_AUoAXoECAwQAw, google.com, USA.

Honeywell, "Honeywell Water Leak Alert Owner's Guide", 2017, 34-00023EFS-05 M.S. Rev. Jun. 2017, Honeywell International Inc., USA.

Honeywell, "Lyric Wi-Fi Water Leak and Freeze Detector", 2015, 33-00080-01 M.S. 10-15, Honeywell Automation and Control Solutions, Golden Valley, MN, USA.

Honeywell, "Water Alarm RWD41", Jan. 2011, 67-5409-JJ, Honeywell Automation and Control Solutions, Golden Valley, MN, USA.

Leaksmart, "Snap by LeakSmart Kit", 2020, https://leaksmart.com/products/, Leaksmart, Inc., Bedford Heights, OH, USA.

More, Ajay, "Water Leakage Detector Systems Market 2019 Global Industry Analysis, Development, Revenue, Future Growth, Business Prospects and Forecast to 2024: 360 Research Reports", Aug. 29 2019, https://www.theexpresswire.com/pressrelease/Water-Leakage-Detector-Systems-Market-2019-Global-Industry-Demand-Recent-Trends-Size-and-Share-Estimation-by-2024-with-Top-Players-360ResearchReportscom_10357552, 360 Research Reports (distributed by The Express Wire).

Nvent Raychem Tracetek, "TT1000 Water Sensing Cable", 2018, Raychem TraceTek DS-H53870_EN-1805, https://www.nventthermal.com/Images/RaychemTraceTek-DS-H53870-TT1000-EN_tcm432-26478.pdf, nVent Elecric plc, St. Louis Park, MN USA.

RLE Technologies, "SC Leak Detection Sensing Cable", Mar. 2019, v03.19, https://rletech.com/wp-content/uploads/2019/04/SeaHawk-SC-Sensing-Cable-Datasheet-v3.19.pdf, RLE Technologies, Ft. Collins, CO.

Siemens, "Synco™ living Water detector QFP910", Mar. 1, 2016, CE1N2732en, Siemens Building Technologies, Siemens Switzerland Ltd, Zug, Switzerland.

Tatsuta, "Water Leakage Detector System Technical Document", 2017, Tatsuta Electronic Materials & System Equipment Group, Tatsuta Electric Wire & Cable, Co., Ltd., Osaka, JP.

TTK, "Sense Cables for Water / Acid Leak Detection & Location", retrieved Feb. 28, 2020, http://www.ttkuk.com/water-acids-leak-detection/products/sense-cables/, TTK S.A.S., Paris France.

Waxman, "LeakSmart: Complete Home Water Protection", 2017, https://waxman.com/brands/leaksmart.html, Waxman Consumer Products Group, Inc., Bedford Heights, OH, USA.

* cited by examiner

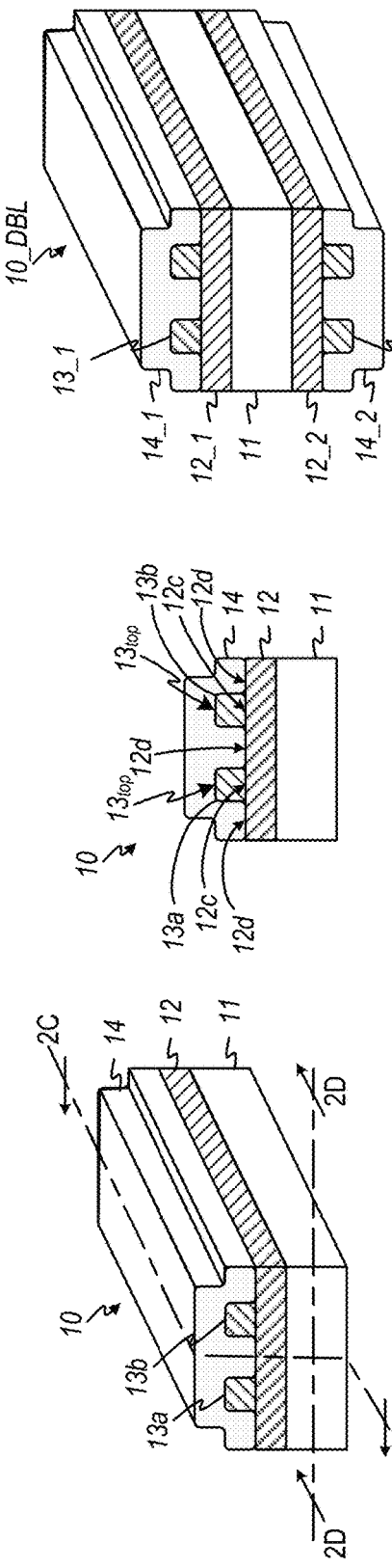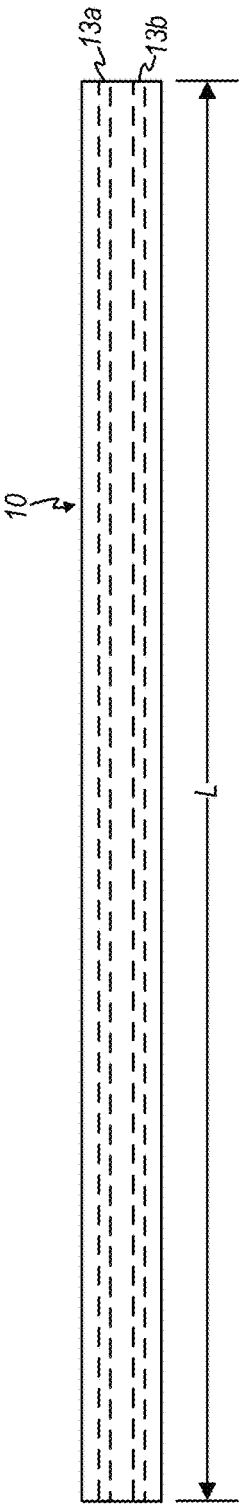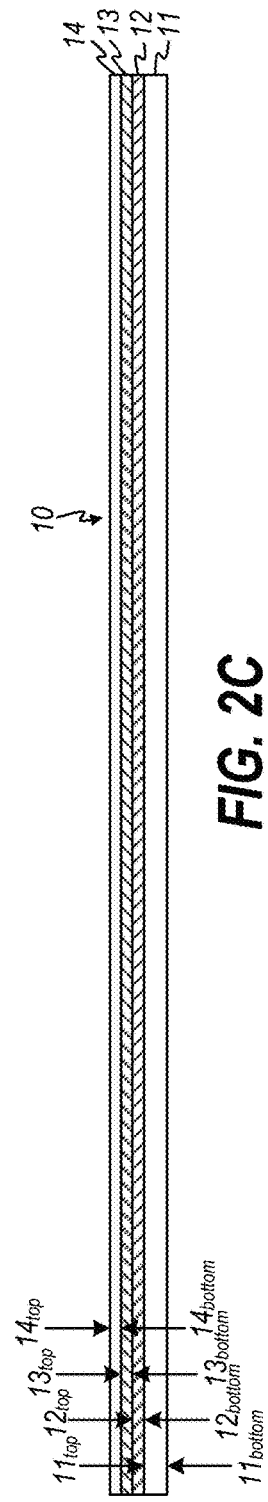

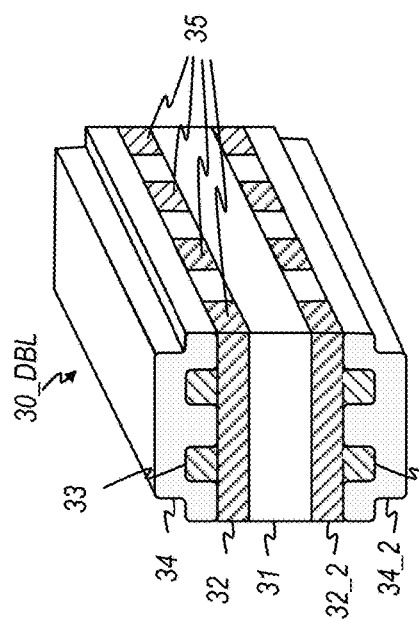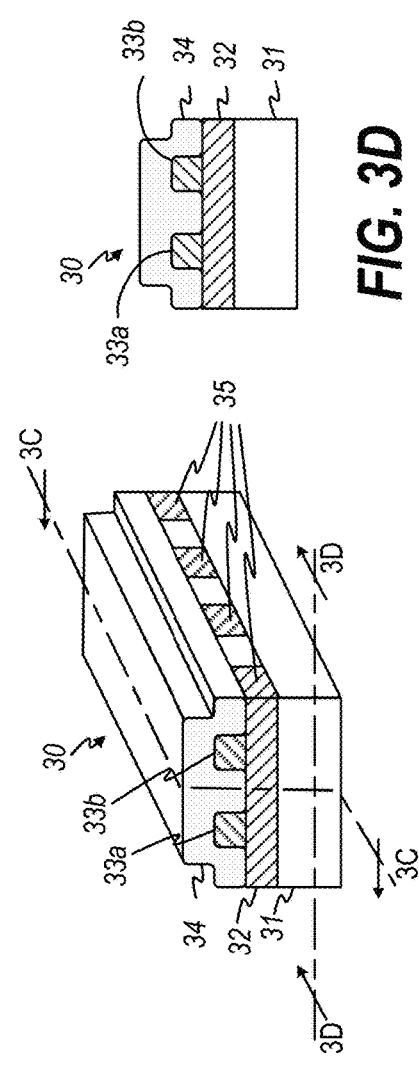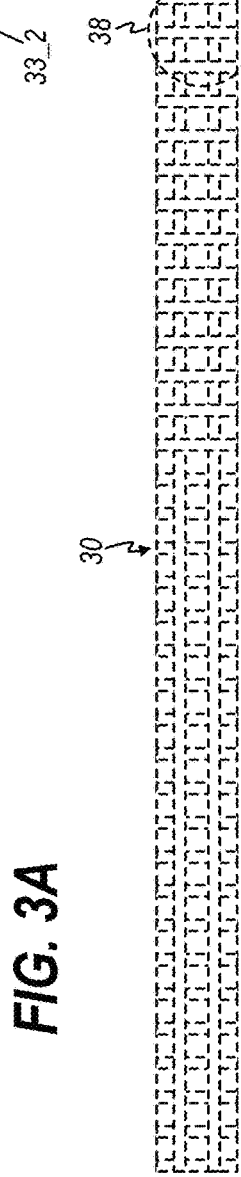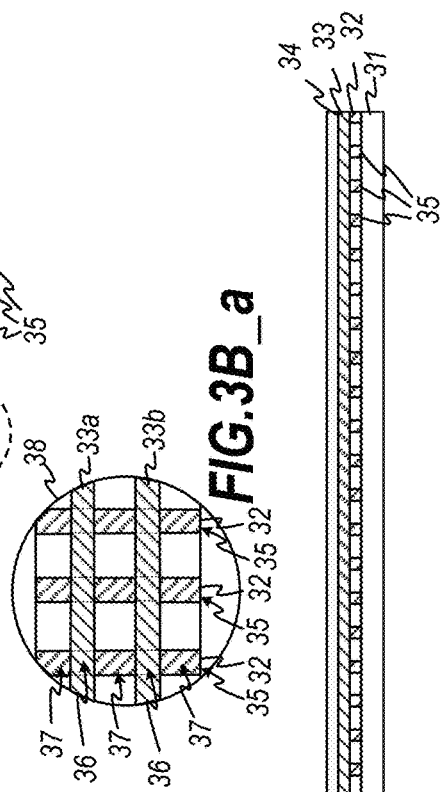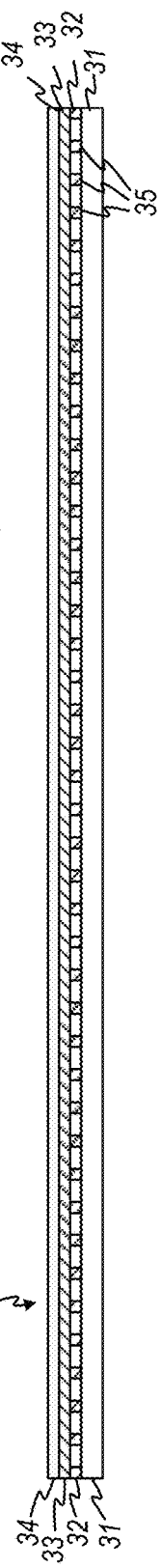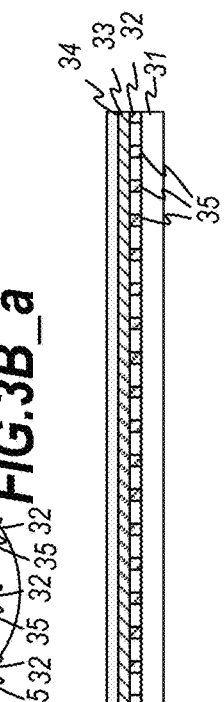
FIG. 3A
FIG. 3B
FIG. 3B_a
FIG. 3C
FIG. 3D
FIG. 3E

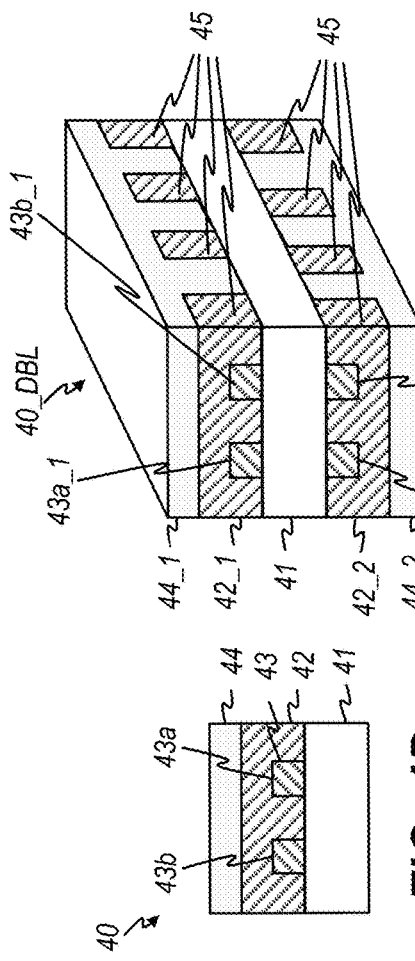
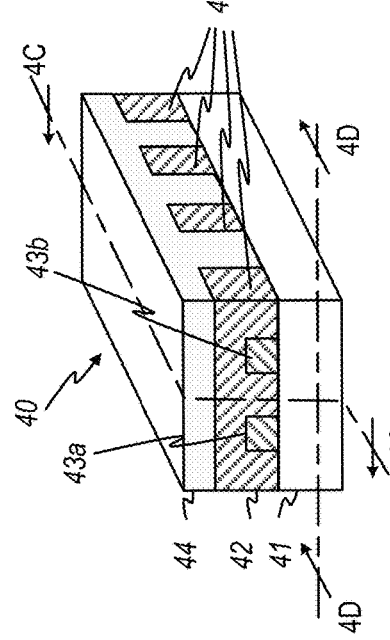
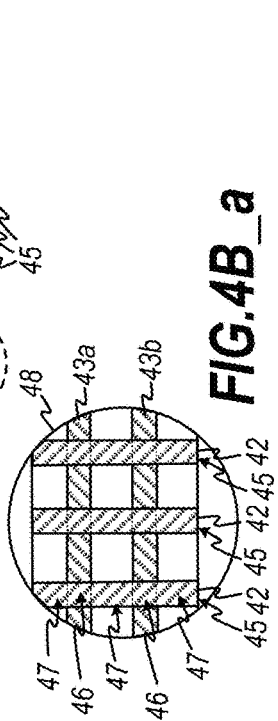
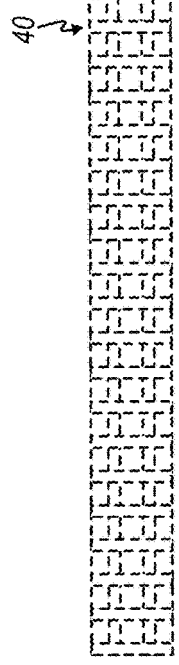
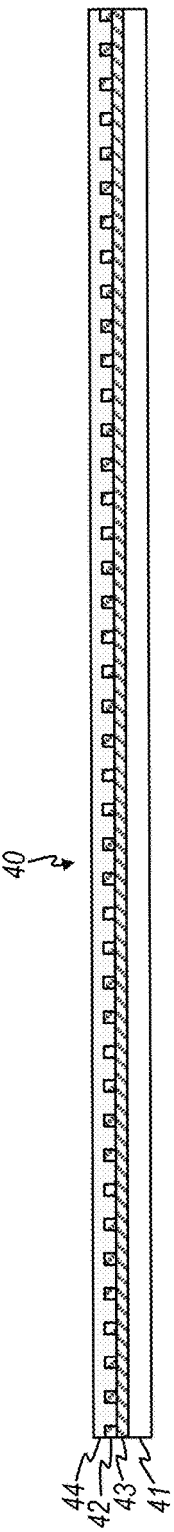

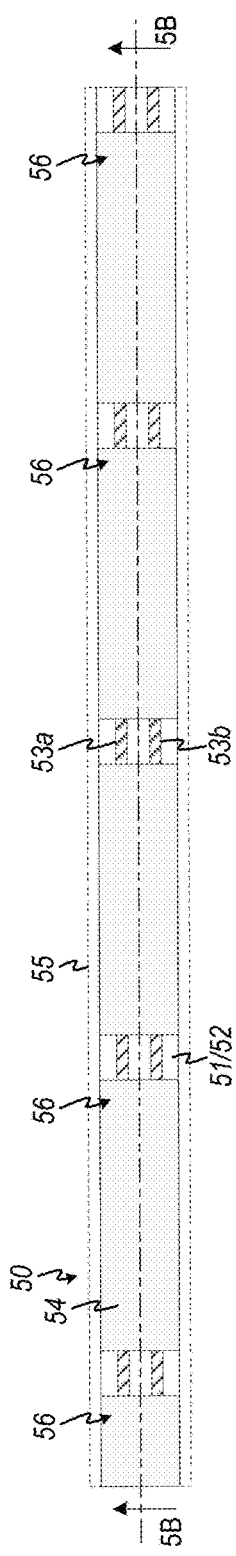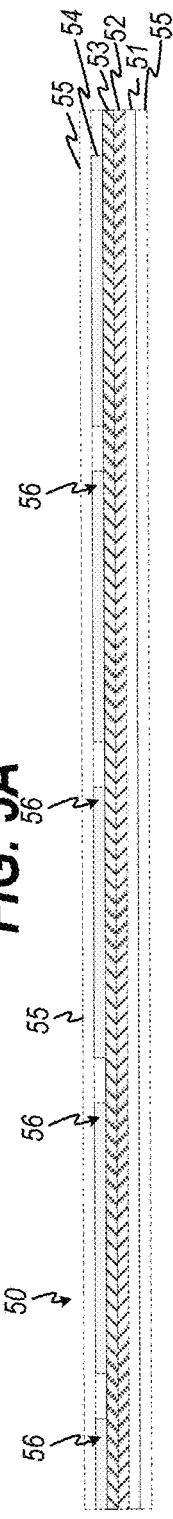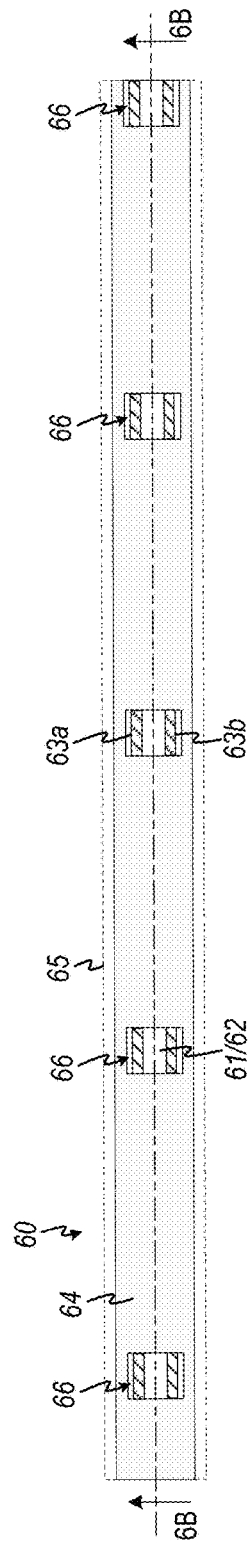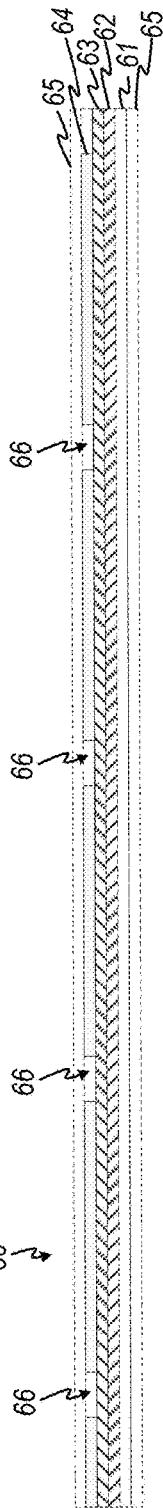
FIG. 5A
FIG. 5B
FIG. 6A
FIG. 6B

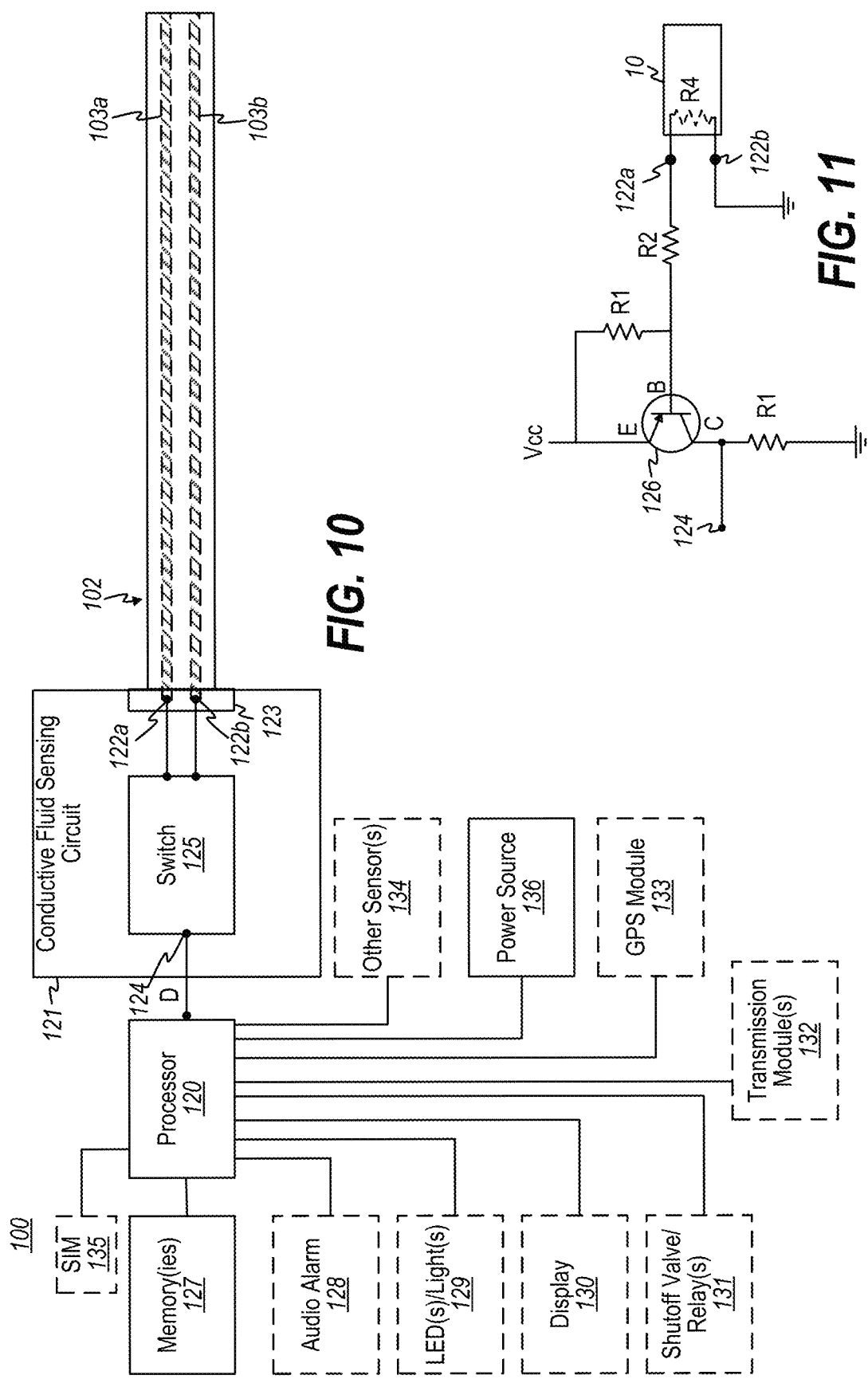

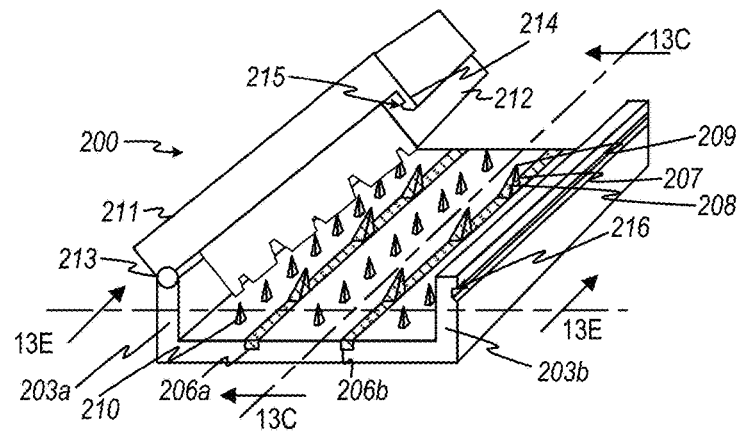
FIG. 13B
FIG. 13C
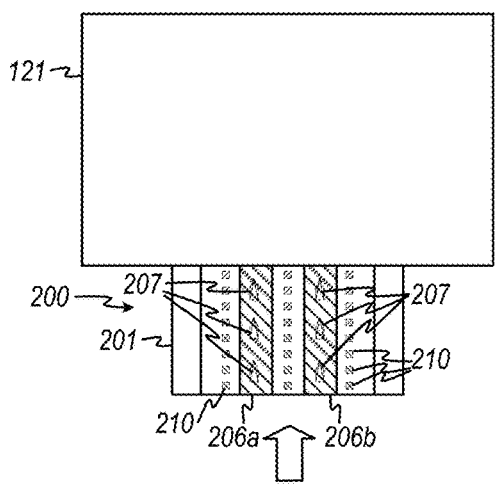
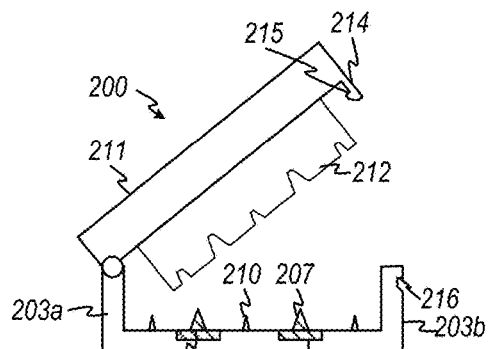
FIG. 13D
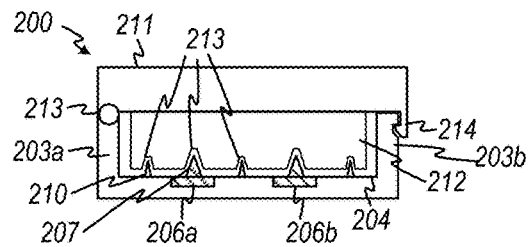
FIG. 13E
FIG. 13A

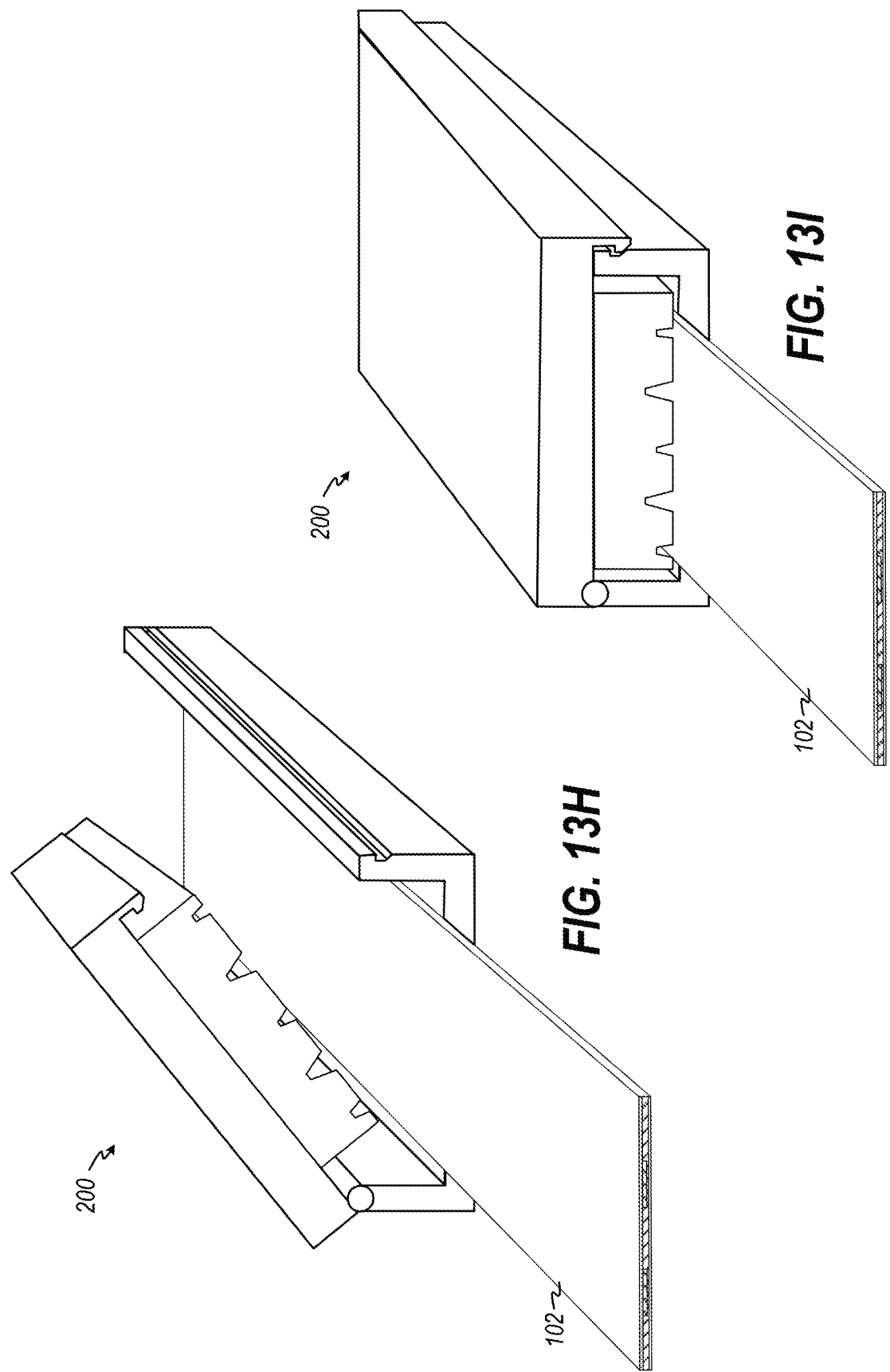

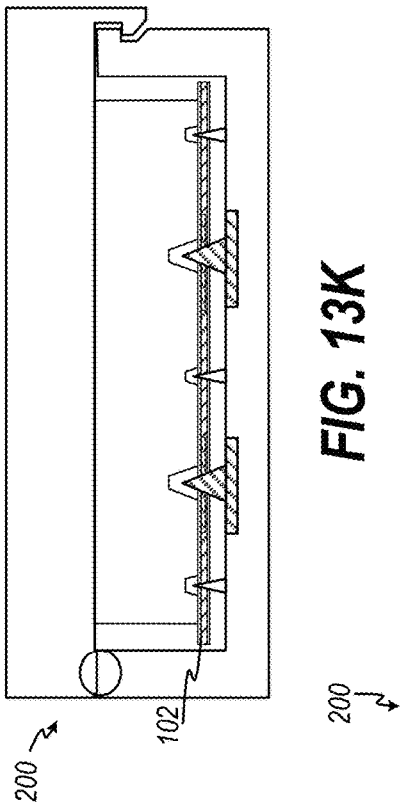
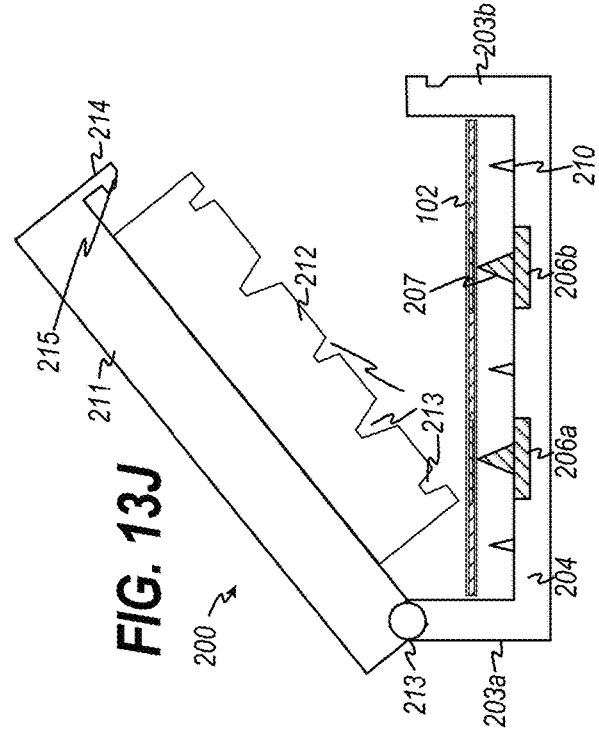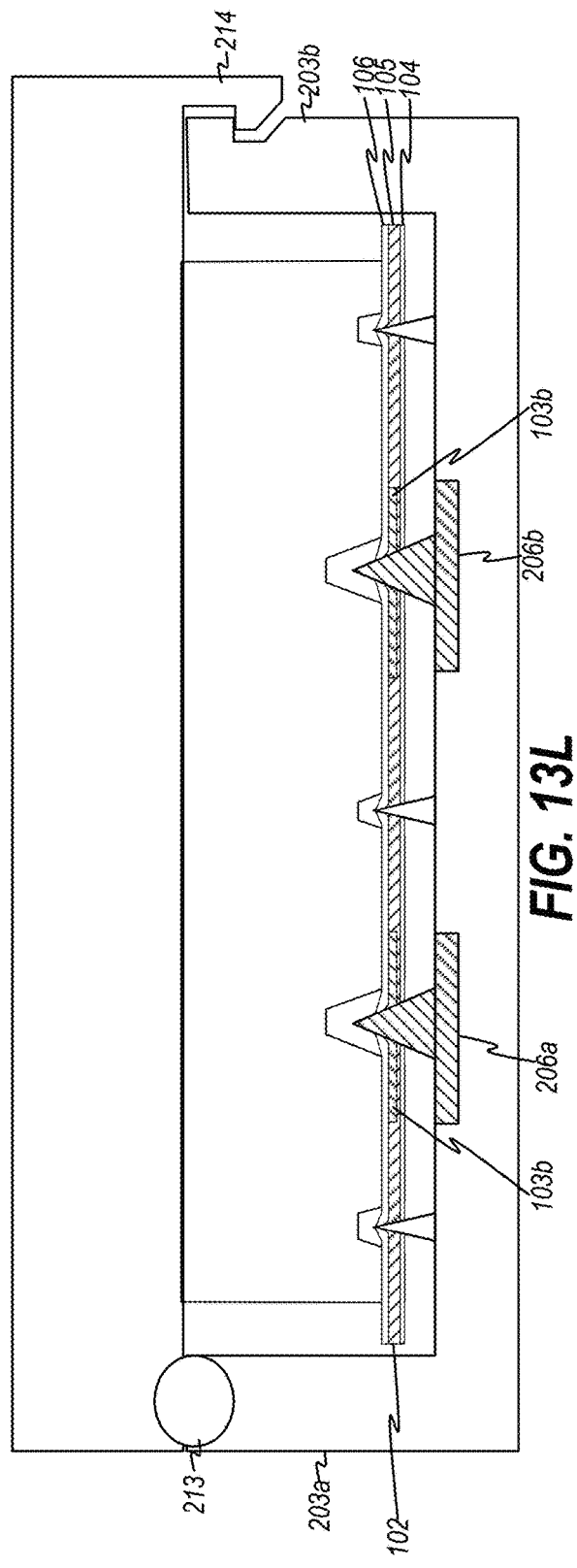
FIG. 13J
FIG. 13K
FIG. 13L

CONDUCTIVE FLUID SENSOR CABLE

BACKGROUND OF THE INVENTION

The present invention relates generally to detecting conductive fluid leaks, and more particularly to a conductive fluid sensor cable for use with a conductive fluid sensing system.

Water and other fluid leaks can cause significant damage to property and electronics if not detected and remediated in a timely manner. Various moisture and fluid sensors are available on the market, and generally include a pair of electrical probes that conduct current when both probes contact a continuous body of conducting fluid, such as undistilled water (water with dissolved salts and other ionic compounds, which is typical in tap water). The probes are connected to a conductive fluid sensor which drives a notification system such as an audio or visual indicator that indicates the presence or absence of conductive fluid across the probes. The notification system may also generate signal(s) that drive other equipment. For example, the notification system may drive a relay which turns off a water supply when conductive fluid is detected.

Some conductive fluid sensors extend the sensing probes using a length of cable that includes individual moisture sensors at various points along the cable. These cables are expensive to manufacture and typically must be terminated in a cable-side connector or stiffened termination on each end of the cable, and thus are generally available only in fixed predetermined lengths.

SUMMARY OF THE INVENTION

The present invention conductive fluid sensor cable for use with a conductive fluid sensor that is inexpensive to manufacture, reliably detects conductive fluid when used in conjunction with a conductive fluid sensing system, can be cut to any desired length, is easy to install, and can be used with a variety of different conductive fluid sensing systems.

In embodiments, the conductive fluid sensor cable comprises a substrate having a first surface and extending in an extension direction, a pair of electrically isolated first and second conductors extending along the first surface of the substrate in the extension direction, and cover material disposed in direct contact with both the first and second conductors and arranged to allow fluid contact between the first and second conductors and conductive fluid when the conductive fluid contacts the cable. The substrate, conductors and cover material are adhered together to form the cable. Preferably, the substrate, conductors, cover material and adhesive are formed in flat layers. In an embodiment, the cable substrate, conductors, cover material and adhesive comprises flexible material, resulting in a flexible cable.

In an embodiment, the cover material is fluid-permeable material that allows conductive fluid to penetrate through the cover material to contact the first and second conductors and thereby form a conductive fluid path between the first and second conductors. Such fluid-permeable material may be wicking material that wicks the conductive fluid across the first and second conductors to form a conductive path between the conductors. In an embodiment, the wicking material swells when it absorbs fluid.

In an embodiment, the cover material is deposited on first portions of the first and second conductors, the cover material arranged to form void sections that expose second portions of the first and second conductors through, or around sections of, the deposited cover material, the void sections allowing formation of a conductive fluid path between the conductors when conductive fluid flows into the void sections. When implementing a cover comprising cover material arranged to form void sections, the cover material itself may be implemented with either fluid-permeable material or non-fluid-permeable material.

Embodiments of cables implemented in accordance with the invention may further be encased in wicking material.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2A is a perspective view of a portion of a cable implemented in accordance with a first embodiment of the invention;

FIG. 2B is a plan view of a cable implemented in accordance with the first embodiment cable of FIG. 2A;

FIG. 2C is a cross-sectional view of the first embodiment cable of FIG. 2A along the line 2C-2C looking in the direction of the arrows;

FIG. 2D is a cross-sectional view of the first embodiment cable shown in FIG. 2A along the line 2D-2D looking in the direction of the arrows;

FIG. 2E is a perspective view of a portion of a double-sided version of the first embodiment cable of FIG. 2A;

FIG. 3A is a perspective view of a portion of a cable implemented in accordance with a second embodiment of the invention;

FIG. 3B is a plan view of the second embodiment cable of FIG. 3A;

FIG. 3B_a is an enlarged plan view of a portion of the second embodiment cable of FIG. 3B;

FIG. 3C is a cross-sectional view of the second embodiment cable of FIG. 3A along the line 3C-3C looking in the direction of the arrows;

FIG. 3D is a cross-sectional view of the second embodiment cable of FIG. 3A along the line 3D-3D looking in the direction of the arrows;

FIG. 3E is a perspective view of a portion of a double-sided version of the second embodiment cable of FIG. 3A;

FIG. 4A is a perspective view of a portion of a cable implemented in accordance with a third embodiment of the invention;

FIG. 4B is a plan view of the third embodiment cable of FIG. 4A;

FIG. 4B_a is an enlarged plan view of a portion of the third embodiment cable of FIG. 4B;

FIG. 4C is a cross-sectional view of the third embodiment cable of FIG. 4A along the line 4C-4C looking in the direction of the arrows;

FIG. 4D is a cross-sectional view of the third embodiment cable of FIG. 4A along the line 4D-4D looking in the direction of the arrows;

FIG. 4E is a perspective view of a portion of a double-sided version of the third embodiment cable of FIG. 4A;

FIG. 5A is an orthogonal view looking at the top of a cable implemented in accordance with a fourth embodiment of the invention;

FIG. 5B is a cross-sectional view of the fourth embodiment cable of FIG. 5A along the line 5B-5B looking in the direction of the arrows;

FIG. 6A is an orthogonal view looking at the top of a cable implemented in accordance with a fifth embodiment of the invention;

FIG. 6B is a cross-sectional view of the fifth embodiment cable of FIG. 6A along the line 6B-6B looking in the direction of the arrows;

FIG. 10 is a block diagram of a conductive fluid sensing system;

FIG. 11 is a schematic diagram of a conductive fluid sensing switch circuit;

FIGS. 13A-13L depict an example connector for receiving a cable implemented in accordance with the invention;

DETAILED DESCRIPTION

Figure 1A:
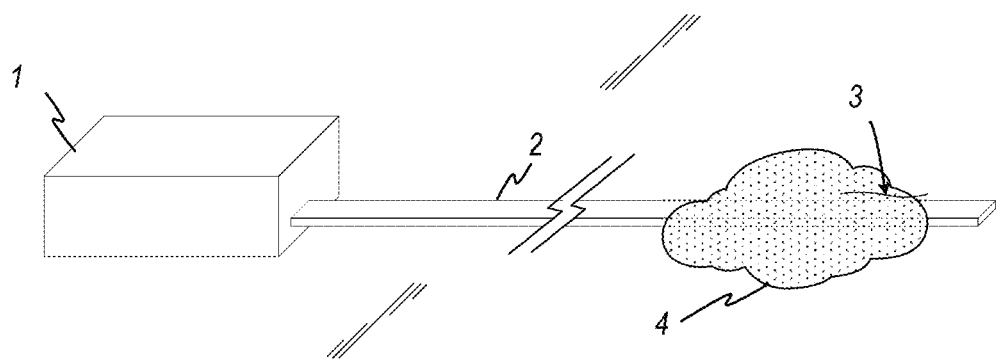
FIG. 1A is a perspective view of a conductive fluid sensor cable installed in an environment.

Turning now to the drawings, FIG. 1A depicts an environment having a conductive fluid sensing system installed therein. The conductive fluid sensing system includes a conductive fluid sensor 1 connected to a conductive fluid sensor cable 2. Cable 2 extends from the sensor 1 over a surface 3. If a body of fluid 4 flows into contact with the cable 2 (and across a pair of conductors embedded therein), the fluid forms a resistive connection across a pair of conductors in the cable 2. As used herein, the term "resistive connection" is a conductive path through which current flows and is characterized by the characteristic impedance of the conductive fluid medium through which current travels to enable current flow between conductors the cable. The conductive fluid sensor 1 detects a current flow between the conductors and indicates the presence of fluid on the surface 3.

Figure 1B:
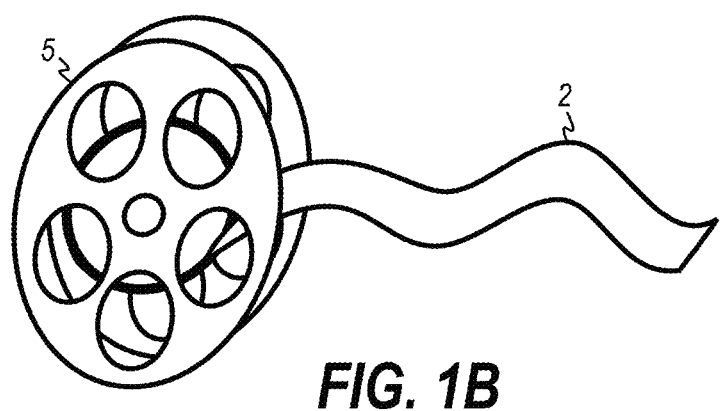
FIG. 1B is a perspective view of flexible cable wound on a spool.

In embodiments, the conductive fluid sensor cable 2 may be manufactured in long lengths, and when fabricated using flexible materials, may be conveniently stored on a spool 1 until ready for use, as illustrated in FIG. 1B. The conductive fluid sensor cable 2 is advantageously manufactured for low cost, ease of manufacture, and may be cut to any desired length for ease of fit and installation in the field.

FIGS. 2A-2D illustrate an exemplary embodiment 10 of a conductive fluid sensor cable 2. As shown in FIGS. 2A-2D, cable 10 comprises substrate 11, adhesive layer 12, conductive layer 13 and cover layer 14. Substrate 11 is defined by first and second surfaces $11_{top}$, $11_{bottom}$, and extends lengthwise in an extension direction, along a length L. Adhesive layer 12 having top and bottom surfaces $12_{top}$, $12_{bottom}$ is disposed at its bottom surface $12_{bottom}$ on top surface $11_{top}$ of substrate 11. Conductive layer 13 having surfaces $13_{top}$, $13_{bottom}$ is disposed at its bottom surface $13_{bottom}$ on top surface $12_{top}$ of adhesive layer 12, and cover layer 14 having surfaces $14_{top}$, $14_{bottom}$ is disposed at its bottom surface $14_{bottom}$ over and in contact with top surface $13_{top}$ of conductive layer 13 and portions 12d of top surface $12_{top}$ of adhesive layer 12. The conductive layer 13 includes isolated first and second conductors 13a, 13b disposed in side-by-side parallel spaced relationship extending in the extension direction of the substrate 11. In an embodiment, the top surface $14_{top}$ of cover layer 14 forms an exterior surface of the cable 10 while the bottom surface $14_{bottom}$ of cover layer 14 adheres to portions of the top surface $12_{top}$ of the adhesive layer 12 that are not covered by the conductors 13a, 13b, thereby sandwiching the conductors 13a, 13b between the adhesive 12 and cover layer 14 to securely hold the conductors 13a, 13b in place within the cable 10. The cover layer 14 comprises cover material disposed in direct contact with both the first and second conductors and arranged to allow fluid contact between the first and second conductors and conductive fluid when the conductive fluid contacts the cable.

In an embodiment, the substrate 11 is formed of a flexible material (i.e., material that is bendable without breaking) such as polyimide or polyester, fabric, etc. The flexible material may also be formed from a normally rigid material (such as, without limitation, FR-4) that is thinned down to a few tens of micrometers in thickness to gain sufficient flexibility to bend without breaking. In other embodiments, the substrate may be formed using a rigid material, such as, by way of example and not limitation, FR-2 or FR-4—in such case the cable 2 will not be flexible.

In an embodiment, cover layer 14 is formed using a fluid-permeable material that allows fluid to penetrate through the layer 14 from its top surface $14_{top}$ through to its bottom surface $14_{bottom}$. In a preferred embodiment, the cover layer 14 comprises a wicking material having non-conductive, moisture-absorbing, moisture-permeable properties that exhibits capillary action, or wicking, in the presence of fluid to pull fluid across and through the material. Since different wicking materials absorb fluid at different rates, through deliberate selection of the particular wicking material used as the cover layer 14, one can implement a coarse form of control over the rate at which a conductive connection is formed across the conductors 13a, 13b in the presence of conductive fluid. In an embodiment, the cover layer 14 comprises wicking material formed of a fluid-absorbing material that swells or enlarges as it absorbs and retains fluid. The advantage of using such a swelling-type wicking material is that the wicking material is more likely to create fluid contact across the conductors 13a, 13b and maintain such fluid contact in the event that the wicking material is somewhat loosely formed across the conductors 13a, 13b. Additionally, depending on the type of swelling-type wicking material used, the rate at which a conductive connection forms between the conductors 13a, 13b in the presence of fluid may differ based on material type, providing an aspect of control over the reaction time of the conductive fluid sensing circuit. Without limitation, examples of suitable wicking materials include cotton, wool, rayon and other synthetic fabrics, braided materials, or other natural or synthetic absorbent or super absorbent materials, including fluid-permeable sleeves containing fluid-absorbing fluid-swelling material such as super absorbent gel or other material.

In an alternative embodiment, the cover layer 14 comprises a dielectric or other non-absorbing but fluid-permeable material such as a fluid-permeable film. In yet another alternative embodiment, the cover layer 14 comprises non-fluid-permeable material that is deposited in non-contiguous sections arranged to form voids (i.e., absence of cover material) therebetween and therethrough. For example, the cover layer material may be applied and arranged as a plurality of dots, stripes, stippled sections low-resolution that may or may not be fluid permeable and that are arranged to form void sections (i.e., absence of the material) that expose portions of the cable conductors 13a, 13b through the cover layer 14. As a specific example provided by way of illustration and not limitation, the cover layer may be formed by spraying a low-resolution coat of silicone rubber or other elastomer or sprayable dielectric (or even a B-stage adhesive that is later exposed to high heat or UV light for final cure), wherein the low-resolution coat comprises miniature dots arranged to form gaps or voids (i.e., absence of cover material 14) therebetween on the surface of the conductors 13a, 13b (as discussed below in reference to FIGS. 7A-7C). In such embodiment, the miniature dots form a protective cover 14 over the conductors 13a, 13b while leaving miniature voids exposing the conductors 13a, 13b and able to collect and retain fluid in fluid contact with the conductors 13a, 13b when fluid flows or over or collects on the top surface of the cable 10.

The cover layer 14 serves multiple purposes: (1) it is formed to allow fluid to permeate the cover of the cable to enable formation of a conductive connection across the conductors; (2) it assists in securing the conductors 13a, 13b in place within the structure of the cable 10 by forming, in conjunction with the adhesive layer 12, a fluid-permeable secured cover over the conductors 13a, 13b; (3) when such cover layer 14 comprises wicking material, it absorbs water or other conductive fluid and via capillary action wicks the fluid across the conductors 13a, 13b to more reliably ensure that a resistive connection is formed for the conductive fluid sensor 1 to detect; (4) the selection of the particular fluid-permeable material can be used as a coarse mechanical control over the rate at which the resistive connection is formed (either assisting in rapid connection or slowing down the formation of the resistive connection); (5) it assists in protecting the conductive layer 13 and adhesive layer 12 from environmental elements; and (6) in the absence of fluid it electrically isolates the conductors 13a, 13b from objects that come in contact with the exposed surface $14_{top}$ of the cover layer 14, thereby assisting in protecting people and objects from unintentionally causing a short or forming a resistive connection across the conductors 13a, 13b when such people or objects contact the cable 10.

In an embodiment, the cover layer 14 comprises a single unit (i.e., a single piece taken alone, or multiple pieces joined together to form a single piece) of fluid-permeable material that preferably covers all, or substantially all, of the first surface 13 top of the conductors 13a, 13b, and all, or substantially all, of the portions 12d of the first surface 12 top of the adhesive layer 12 that are not covered by the conductors 13a, 13b. Such an embodiment is depicted in FIGS. 2A-2E. In an alternative embodiment, as best depicted in FIGS. 5A-5B, 6A-6B, and 7A-7C, the cover layer 14 comprises a plurality of individual sections of fluid-permeable material, whereby each individual section forms a cover over corresponding portions of the conductors. Preferably, one or more of such individual sections of fluid-permeable material also adheres to and forms a cover over portions 12d of the adhesive layer 12, such portions 12d being laterally adjacent on each side of the conductors 13a, 13b. Fluid-permeable material formed over the conductors 13a, 13b and adhered on both sides of each conductor assists in ensuring that the conductors remain securely in place when exposed to environmental conditions.

In an embodiment, the layers 11, 12, 13 and 14 are arranged in the order illustrated in FIGS. 2A-2D. In an alternative embodiment, there may be additional layers (not shown) of various materials between the flexible substrate layer 11 and adhesive layer 12. In another alternative embodiment, the cover layer 14 may be eliminated altogether, such that the cable 10 comprises only the flexible substrate 11, adhesive 12 and conductors 13a, 13b. In an alternative embodiment, layer 14 may be implemented by way of a fluid-permeable sleeve or casement, such as a braided fiber sleeve which encapsulates (i.e., surrounds) the combined substrate 11, adhesive 12, conductive 13 layers.

FIG. 2E depicts a double-sided version 10_DBL of cable 10, comprising substrate layer 11, adhesive layer 12 (referenced as 12_1), conductive layer 13 (referenced as 13_1, and cover layer 14 (referenced as 14_1) on one surface $11_{top}$ of the substrate, as shown in FIGS. 2A-2D, and additionally comprising a second adhesive layer 12_2 disposed on the second surface $11_{bottom}$ of the flexible substrate 11, a second conductive layer 13_2 disposed on the second adhesive layer 12_2, and a second cover layer 14_2 disposed on the second conductive layer 13_2 and portions of the second adhesive layer 12_2, as shown. Layers 12_2, 13_2 and 14_2 mirror layers 12, 13 and 14 (shown in FIG. 2E as 12_1, 13_1, 14_1) with the substrate 11 supporting each layered stack (12_1/ 13_1/14_1 and 12_2/13_2/14_2) on respective opposites surfaces $11_{top}$, $11_{bottom}$ thereof.

FIGS. 3A-3D depict an alternative embodiment 30 of conductive fluid sensor cable 2. As illustrated, cable 30 includes substrate 31, adhesive layer 32, conductive layer 33 and cover layer 34. As best seen in FIGS. 3A, 3C, 3C_a and 3D, adhesive layer 32 is disposed on substrate 31 in non-contiguous sections 35 that are dispose directly on the substrate 31. Conductive layer 33 is disposed over the adhesive layer 32 and comprises conductors 33a, 33b that are electrically isolated from one another in the absence of conductive fluid. FIG. 3B_a is an enlarged view of portion 38 of FIG. 3B. As best seen in FIG. 3B_a, first portions 36 of a top surface of the adhesive sections 35 adhere to corresponding underside of portions of conductors 33a, 33b, and second portions 37 of the top portion of adhesive sections 35 adhere to corresponding underside portions of the cover layer 34. In other words, the conductors 33a, 33b are layered (perpendicularly) over the sections 35 of adhesive 32.

In an embodiment, as best seen in FIGS. 3B and 3B_a, the adhesive sections 35 comprise a plurality of adhesive stripes formed perpendicular to the extension direction of the cable 30. While illustrated as perpendicular stripes deposited on the substrate 31, sections 35 may be of any shape and size that meets the conditions of adhering at least portions of the conductors 33a, 33b and cover layer 34 to the substrate 31. For example, in alternative embodiments (not shown), the adhesive sections 35 may comprise a plurality of stripes arranged on the substrate diagonally to the extension direction of the cable 30. Other arrangements may include, without limitation formation on the substrate of crisscrossed stripes, or other non-contiguous shapes such as dots, stipples, spots, dashes, circles, rectangles, etc., so long as the adhesive 32 is formed on the substrate 31 such that the sections 35, either individually or in conjunction with other sections 35, adhere to portions of the underside of conductors 33a, 33b, and to portions of the underside of cover layer 34 in a manner so as to secure the conductors 33a, 33a in place between the substrate 11 and cover layer 34.

In the embodiment shown in FIGS. 3A-3D, the cable 30 may be formed to include only the substrate 31, adhesive layer 32, conductive layer 33 and cover layer 34 on a first surface 31a of the substrate 31. Optionally, as illustrated in FIG. 3E, a double-sided version cable 30_DBL may be formed by adding an adhesive layer 32_2, a conductive layer 33_2 and a cover layer 34_2 layered in that order on a second surface 31b of the substrate 31.

FIGS. 4A-4D depict an alternative embodiment 40 of conductive fluid sensor cable 2. As illustrated, cable 40 includes substrate 41, conductive layer 43, adhesive layer 42 and cover layer 34. Conductive layer 43 is disposed on substrate 31 and comprises conductors 43a, 43b that are electrically isolated from one another in the absence of conductive fluid. Conductive layer 43 may comprise non-adhesive conductors 43a, 43b, or preferably adhesive conductors. In an embodiment, the conductors 43a, 43b comprise conductive foil tape (comprising conductive foil with adhesive disposed on at least one side of the foil). Note: adhesive between conductive layer 43 and substrate 41 is not shown in FIGS. 4A-4E yet may optionally be included in order to more securely hold the conductors in place on substrate 31. In an embodiment, the conductors 43a, 43b are printed directly onto the substrate 41 using conductive ink and therefore do not require an adhesive.

Adhesive layer 42 is disposed over the conductive layer 43. FIG. 4B_a is an enlarged view of portion 48 of FIG. 4B. As best seen in FIG. 4B_a, first portions 46 of a bottom surface of the adhesive sections 45 adhere to corresponding portions of the top surfaces of conductors 43a, 43b, and second portions 47 of the bottom portion of adhesive sections 45 adhere directly to the substrate 41. The top surface of the adhesive sections 45 adhere to corresponding underside portions of the cover layer 44. In an embodiment, as best seen in FIGS. 4B and 4B_a, the adhesive sections 45 comprise a plurality of adhesive stripes formed perpendicular to the extension direction of the cable 40. In other words, the adhesive layer 42 is disposed in non-contiguous sections 45 that directly contact portions of the top side of conductors 43a, 43b and portions of the top side of the substrate 41.

In alternative embodiments (not shown), the adhesive sections 35 may comprise a plurality of stripes arranged on the substrate 41 diagonally to the extension direction of the cable 30. Other arrangements may include, without limitation formation on the substrate 41 of crisscrossed stripes, or other non-contiguous shapes such as dots, stipples, spots, dashes, circles, rectangles, etc., so long as the adhesive 42 is formed on the substrate 41 such that the sections 45, either individually or in conjunction with other sections 45, adhere to portions 46 of the top of conductors 43a, 43b, and to portions 47 of the top of substrate 41, and wherein the top surface 42 top adheres to the underside 44 bottom of cover layer 44 in a manner so as to secure the conductors 33a, 33a in place between the substrate 11 and cover layer 34.

In the embodiment shown in FIGS. 4A-4D, the cable 40 may be formed to include only the substrate 41, adhesive layer 42, conductive layer 43 and cover layer 44 on a first surface of the substrate 41. Optionally, as illustrated in FIG. 4E, a double-sided version cable 40 DBL may be formed by adding an adhesive layer 42_2, a conductive layer 43_2 and a cover layer 44_2 layered in that order on a second surface of the substrate 41.

FIGS. 5A-5B show the top-down and cross-sectional side view of another alternative embodiment 50 of cable 2, wherein the cable 50 comprises flexible substrate layer 51, conductive layer 53, and cover layer 54, as shown. Cover layer 54 may be fluid-permeable or non-fluid-permeable. Support layer 51 preferably comprises support tape such as polyethylene terephthalate (PET) or polyethylene naphthalate) (PEN). Conductive layer 53 preferably comprises copper or copper/tin, or other conductive, flat foil, wire or conductive ink. In embodiments wherein the cover layer 54 is non-fluid-permeable, cover layer 54 preferably comprises adhesive bo-PET such as Mylar® or other adhesive dielectric film or sealant and is disposed along the extension direction, L, of the cable 50 leaving periodic openings 55 so as to expose sections 55a, 55b of the conductors 53a, 53b to the environment. Alternatively, the cover layer 54 comprises fluid-permeable material and still leaves voids 56. In an embodiment, the cable 50 may be further encased in a wicking material 56 such as cloth or fabric made from natural or synthetic fiber, fabric or fluid-permeable encased swelling materials.

FIGS. 6A-6B show the top-down and cross-sectional side view of another alternative embodiment 60 of cable 2, wherein the cable 60 comprises flexible substrate layer 61, conductive layer 63, and cover layer 64, as shown. In this example, the cover layer 64 is applied as a one-piece layer of material and contains voids 66 (i.e., absence of the cover layer material) through which portions of the conductors 63a, 63b are exposed through the layer 64 to allow fluid flowing or collecting thereover to contact the conductors 63a, 63b. The cable assembly (61, 62, 63, 64) may be further covered by an external fluid-permeable cover or encased in an outer fluid-permeable sleeve 65 in order to cover the exposed portions of the conductors 63a, 63b through the cover layer voids 66. Substrate layer 61 preferably comprises support tape such as polyethylene terephthalate (PET), bo-PET, or polyethylene naphthalate) (PEN). Conductive layer 63 preferably comprises copper or copper/tin, or other conductive, flat foil, wire or conductive ink. Cover layer 64 preferably comprises adhesive bo-PET such as Mylar® or other adhesive dielectric film or sealant. Alternatively, cover layer 64 may be fluid-permeable material.

Figure 7A:
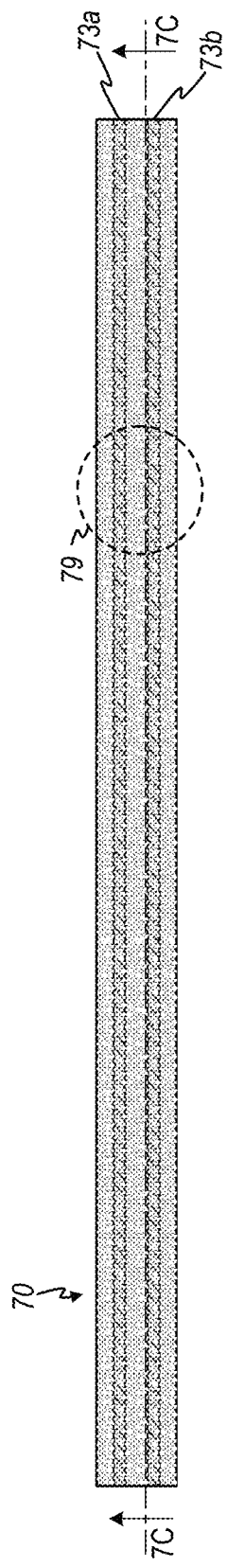
FIG. 7A is an orthogonal view looking at the top of a cable implemented in accordance with a sixth embodiment of the invention.
Figure 7B:
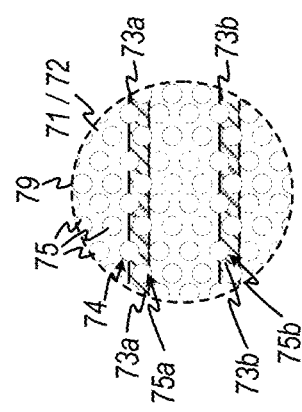
FIG. 7B is an enlarged view of a portion of the sixth embodiment cable of FIG. 7A.
Figure 7C:
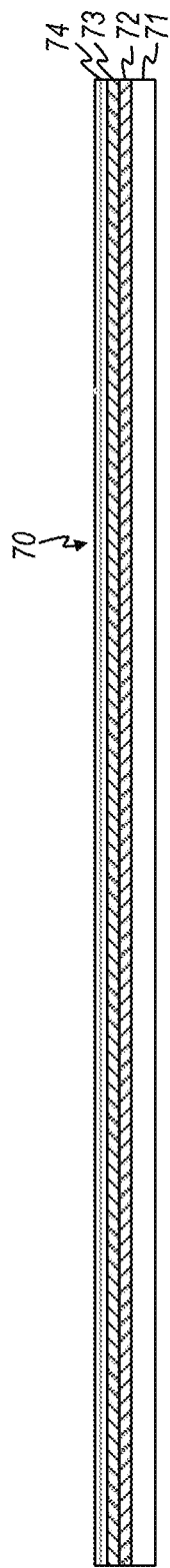
FIG. 7C is a cross-sectional view of the sixth embodiment cable shown in FIG. 7A along the line 7C-7C looking in the direction of the arrows.

FIGS. 7A-7C illustrate an embodiment 70 of a cable 2, having a substrate layer 71, adhesive layer 72, conductive layer 73 comprising conductors 73a, 73b, and cover layer 74, wherein the cover layer 74 comprises a plurality of microdots 75 disposed over the conductive layer 13 and exposed portions of the substrate/adhesive layer(s) 71/72, for example by applying a low-resolution spray of material over the top surfaces of the conductors and exposed portions of the substrate/adhesive layer(s) 71/72. As best seen in FIG. 7B, which shows an enlarged portion 79 of the top surface of cable 70 from FIG. 7A, the cover layer 74 is formed of a plurality (in the thousands or more) of microdots 75 formed with voids therebetween so as to allow fluid to penetrate the layer 74 and contact portions of the conductors 73a, 73b. For example, a microdot 75a covers a portion of conductor 73a and a microdot 75b covers a portion of conductor 73b, but there exist voids between it and other microdots. Thus, conductors 73a and 73b remain partially exposed to contact by penetrating conductive fluid, yet, the large volume of microdots operates to form a low-resolution protective outer cover for the cable 70.

It is to be understood that any of the cover layers 54, 64 or 74 described in FIGS. 5A-5B, 6A-6B, and 7A-7B may be used as the implementation of any of the respective cover layers 14, 34 or 35 in the embodiments shown in FIGS. 2A-2E, 3A-3E, and 4A-4E. Additionally, it is to be understood that each of the cable embodiments 10, 30, 40, . . . 90 may be further encased in a fluid-permeable sleeve or otherwise covered in fluid-permeable material (in addition to the respective cover layers included in the respective cable embodiments).

FIGS. 8A-8D illustrate another alternative embodiment 80 of cable 2. In this embodiment, the cable 80 comprises substrate layer 81, adhesive layer 82, and cover layer 84 having at least one pair of mutually isolated conductors 83a, 83b woven, threaded, knitted, braided or otherwise integrated into the cover layer 84. In an embodiment, the conductors 83a, 83b comprise conductive thread, conductive flat tape, wire or other conductive material. Cover layer 84 having conductors 83a, 83b integrated therein is adhered to substrate layer 81 by adhesive layer 82.

Adhesive layer 82 may comprise a continuous body of adhesive on which cover layer 84 and portions of the threaded conductors 83a, 83b are disposed. In an alternative embodiment (not shown in FIGS. 8A-8D, but implemented similar to how the sections 35 shown in FIGS. 3A-3D are implemented), the adhesive layer 82 is disposed on the substrate 81 in non-contiguous sections that are positioned on the substrate 81 such that when the cable 80 is assembled, first portions of the adhesive sections adhere to the conductors 83a, 83b, and second portions of the adhesive sections adhere to portions of the cover layer 84. In an embodiment, similar to the implementation shown in FIGS. 3A-3D, the adhesive sections comprise a plurality of adhesive stripes formed perpendicular to the extension direction of the cable 80. In alternative embodiments, the adhesive sections may comprise a plurality of stripes arranged diagonally to the extension direction of the cable 80, or may be formed as cross-hatching (crisscrossing the adhesive to form holes in the adhesive layer) or other non-contiguous shapes such as dots, dashes, circles, rectangles, etc., wherein the adhesive 82 is formed on the substrate 81 such that adhesive sections, either individually or in conjunction with other adhesive sections, adhere to portions of the conductors 83c, 83d, and to portions of the cover layer 84 in a manner so as to secure the conductors 83c, 83d in place by way of the adhesive 82 and the cover 84.

Figure 8A:
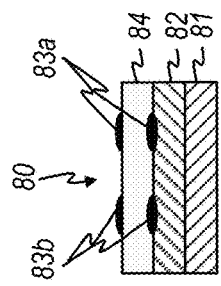
FIG. 8A is a perspective view of a portion of a cable implemented in accordance with a seventh embodiment of the invention.
Figure 8D:
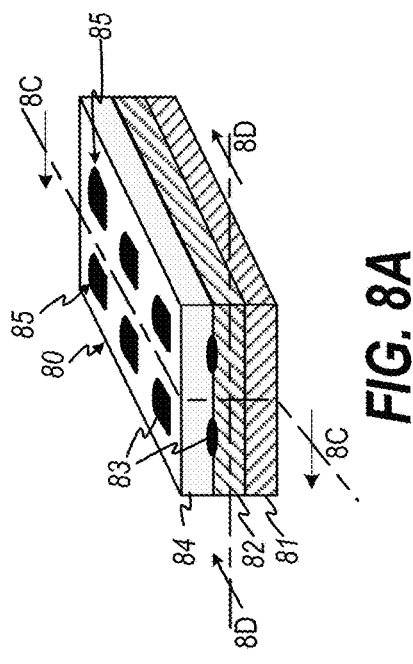
FIG. 8D is a cross-sectional view of the seventh embodiment cable of FIG. 8A along the line 8D-8D looking in the direction of the arrows.
Figure 8B:
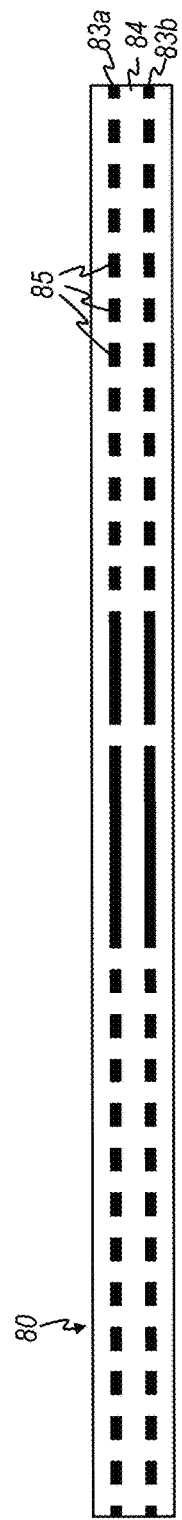
FIG. 8B is an orthogonal view looking at the top of seventh embodiment cable of FIG. 8A.
Figure 8C:
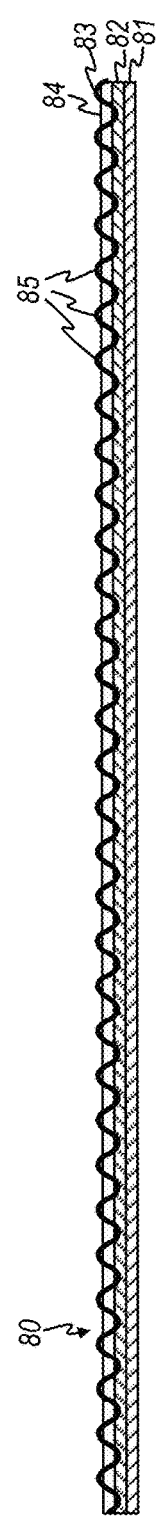
FIG. 8C is a cross-sectional view of the seventh embodiment cable of FIG. 8A along the line 8C-8C looking in the direction of the arrows.
Figure 8E:
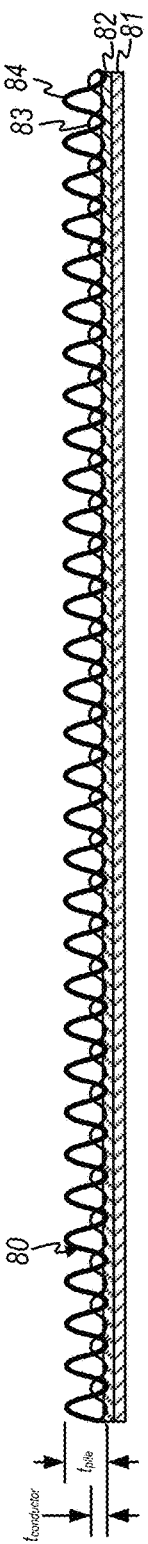
FIG. 8E is a cross-sectional view of the seventh embodiment cable of FIG. 8A along the line 8C-8C looking in the direction of the arrows, showing different pile thickness than in FIG. 8C.
Figure 9D:
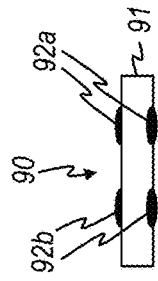
FIG. 9D is a cross-sectional view of the eighth embodiment cable of FIG. 9A along the line 9D-9D looking in the direction of the arrows.
Figure 9A:
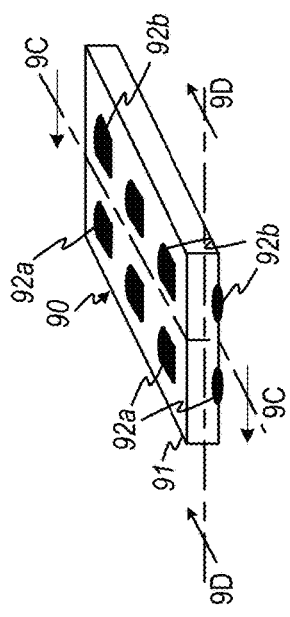
FIG. 9A is a perspective view of a portion of a cable implemented in accordance with an eighth embodiment of the invention.
Figure 9B:
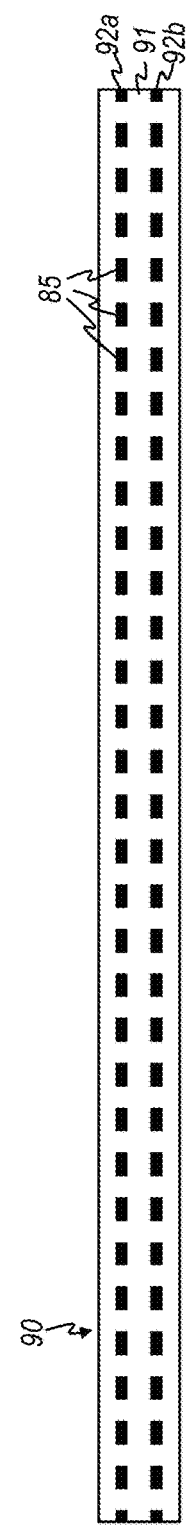
FIG. 9B is an orthogonal view looking at the top of eighth embodiment cable of FIG. 9A.
Figure 9C:
FIG. 9C is a cross-sectional view of the eighth embodiment cable of FIG. 9A along the line 9C-9C looking in the direction of the arrows.
Figure 9E:
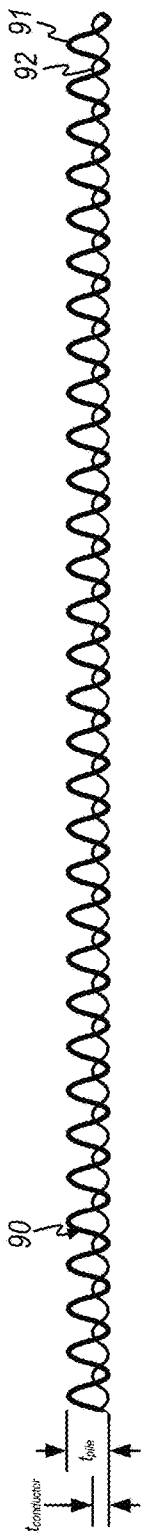
FIG. 9E is a cross-sectional view of the eighth embodiment cable of FIG. 9A along the line 9C-9C looking in the direction of the arrows, showing different pile thickness than in FIG. 9C.

In an embodiment, portions 85 of the conductors 83a, 83b are exposed on the external surface of the cable 80 while other portions of the conductors 83a, 83b are protected within or under the exposed surface of the cover layer 84. The size of the exposed portions 85 of the conductors 83a, 83b depends on the stitch size and/or weave or stitch pattern. In an alternative embodiment, illustrated in FIG. 8E, the cover layer 84 is characterized by a pile (characterized by thickness $t_{pile}$) that protrudes a distance $t_{pile}$ on the outer surface beyond the protrusion $t_{conductor}$ of the conductors 83a, 83b on the outer surface of the cable 80 such that conductors 83a, 83b are substantially protected from external contact by objects and people due to the density and pile of the material of the cover layer 84. A thicker fabric pile $t_{pile}$ on the exterior surface of the cable 80 allows the fabric of the cover layer 84 to serve as a weak insulator between the exposed conductors 83 and objects that come into contact with the fabric pile on the outer surface of the cable 80.

FIGS. 9A-9E illustrate yet another alternative embodiment 90 of cable 2. In this embodiment, the cable 90 comprises substrate layer 91 having at least one pair of mutually isolated conductors 92a, 92b woven, threaded, knitted, braided or otherwise integrated into the substrate layer 91. In an embodiment, substrate layer 91 comprises cloth, fabric, or mesh that is capable of absorbing and wicking liquid. The conductors 92a, 92b comprise conductive thread, conductive flat tape, or wire. Similar to the discussion in connection with FIGS. 8A-8E, conductors 92a, 92b may be more or less exposed depending on the pile $t_{pile}$ of the substrate layer 91 relative to the pile $t_{conductor}$ of the conductors 92a, 92b, and/or weave or stitch pattern.

Notably, each cable embodiment 10, 30, 40, . . . , 90 illustrated in the figures is shown, for convenience of understanding, with exaggerated dimensions. In particular, the thicknesses of the individual layers relative to the width in each depicted embodiment 10, 30, 40, . . . 90, is exaggerated in order to be able to illustrate the construction of the respective cable. In practice, each cable embodiment will typically be on the order of a few millimeters wide, a hundred or more micrometers thick, and a few centimeters up to meters long. In an illustrative embodiment, for example, the cable 10 may have example dimensions as follows:

| layer | width | thickness |
| --- | --- | --- |
| substrate | 3 mm | 0.043 mm |
| conductors | 0.7 mm | 0.035 mm |
| cover | 3 mm | 0.043 mm | with spacing between conductors 3 mm.

Various materials may be used for each of the substrate, base, adhesive, conductor, and wicking/cover layers in each of the embodiments 10, 30, 40 . . . , 90 of cable 2. The substrate/support/base layer(s) may be implemented, by way of example and not limitation, using dielectric material such as biaxially-oriented polyethylene terephthalate (BoPET), polyethylene terephthalate (PET), polyethylene naphthalate (PEN) or other polyester or polyamide films or electrically insulative materials. The substrate/support/base layer(s) may also be implemented using wicking material such as cloth, fabric, mesh, etc. constructed with natural or synthetic non-conductive fibers. Preferably, the substrate is flexible, as discussed herein; alternatively, the substrate may be rigid or semi-rigid, for example using materials such as FR-2 or FR-4.

Examples of adhesive material include, without limitation, non-conductive resins, adhesives and/or epoxies. In a preferred embodiment, the adhesive is a B-stage adhesive that can be applied by dispensing or printing and then partially cured using a latent (low reactivity) curing agent so that it remains in a bondable state. Once the components (e.g., substrate, conductors, cover layer) are placed, the B-stage adhesive is exposed to high heat or UV light for final cure. In an embodiment, the combination of substrate and adhesive layers is pre-manufactured adhesive flexible BoPET tape, such as Mylar®, Melinex, and Hostaphan adhesive tapes. It is to be understood that the adhesive is characterized by electrical insulative properties to prevent current flow between the conductors through the adhesive. Further, in embodiments where the conductors may have portions that directly contact the substrate, it is to be understood that the substrate itself must accordingly be electrically insulative in order to prevent current flow between the conductors through the substrate.

The conductive layer, or conductors, are implemented using conductive material such as, but not limited to, silver, silver ink, copper, tin-plated copper, gold, nickel, aluminum, etc. The conductors in each of the embodiments 10, 20, . . . , 90 are preferably flat conductive foil (which may include an adhesive tape, flat wire, or printed conductive ink, but could also be round wire, conductive thread, conductive traces, etc.

In an embodiment, the substrate and conductive layer together comprises flat flexible cable (FFC) manufactured using BoPET tape and flat foil laminated or adhered thereon. Wicking/cover layer is adhered to the FFC using a B-Stage adhesive. Such construction supports a very inexpensive manufacturing process, a durable cable, and facilitates accurate reliability by water sensors connected to the cable.

In operation, each cable embodiment 10, 20, . . . , 90 serves as a conductive fluid sensor cable (to be operated in conjunction with a conductive fluid sensing circuit) by exposing (through a fluid-permeable layer or a cover layer arranged to form voids therethrough) electrically isolated conductors embedded within the cable to the environment in which the cable is installed. When conductive fluid comes into contact with the cable 102, the cover layer (achieved via fluid-permeable material and/or leaving voids between the layer material) allows fluid to permeate the layer. When the cover layer comprises wicking material, the wicking material absorbs the fluid, pulling it through the wicking material to ensure that the fluid forms a conductive fluid body that forms a resistive connection between the otherwise isolated (i.e., in the absence of fluid) conductors. The wicking material, through capillary action, enhances the likelihood that the fluid will span both conductors to ensure detection of the presence of fluid. The conductors of the cable 102 connect to a conductive fluid sensing circuit (discussed hereinafter) which detects and indicates the presence of conductive fluid based on current flow through a resistive connection formed by conductive fluid across the conductors of the cable 102.

FIG. 10 illustrates an exemplary conductive fluid sensing system 100. System 100 includes a conductive fluid sensing circuit 121 having first and second input nodes 122a, 122b, electrically connected to an input connector 123. Connector 123 is configured to receive, retain and electrically connect input nodes 122a, 122b to respective first and second conductors 103a, 103b of a conductive fluid sensor cable 102 upon insertion of one end of such cable 2 into the connector 123. In an embodiment, the conductive fluid sensing circuit 121 comprises a switch circuit 125 that generates on switch output node(s) 124 one or more driving signal(s) whose state(s) indicate the presence, or lack or presence, of conductive fluid across the conductors 103a, 103b on cable 102. Electronic switches are well-known in the art; therefore the switch circuit 125 may be implemented according to any suitable switching circuit that produces a driving signal based on current flow or measured resistance across the conductors 103a, 103b when the cable 102 is connected to the conductive fluid sensing circuit 121.

Referring to FIG. 11, and without limitation, in one embodiment the electronic switch 125 in the conductive fluid sensing circuit 121 comprises a PNP-type transistor 126 having an emitter terminal E connected to a voltage source Vcc, a collector terminal C connected through a current limiting resistor R1 to a circuit ground, and a base terminal B connected through a current limiting resistor R2 to the circuit Vcc and also through a current limiting resistor R3 to one of the input nodes 122a, of the connector 123. The other input node 122b is connected to the circuit ground. The driving signal on node 124 is connected at the transistor collector C. In the absence of conductive fluid across the conductors 103a, 103b of the cable 102, the transistor 126 is in cutoff mode and no current flows between the emitter E and collector C. When conductive fluid forms a pathway connecting the conductors 103a, 103b, a resistive connection (shown as resistance R4) allows current flow across R2, driving down the base-emitter voltage $V_{BE}$. When there is sufficient current flow across R4, the base-emitter voltage $V_{BE}$ is driven down sufficiently to overcome the threshold voltage $V_T$ of the transistor 126, allowing current flow from emitter E to collector C, and ultimately driving the driving signal node 124 to voltage level close to Vcc (corresponding to a high level logic level) that is used by subsequent circuitry.

The switch circuit shown in FIG. 11 is for purposes of example and not limitation, and the invention is not intended to be limited by the particular implementation of the switch circuit 125. Similarly, the use of a switching circuit 125 in the implementation of the conductive fluid sensing circuit 121 is shown for purposes of example and not limitation, and the invention is not intended to be limited by the particular implementation of the conductive fluid sensing circuit 121 that generates a signal D indicating the presence or lack of presence of conductive fluid across conductors 3a, 3b of the conductive fluid sensor cable 2, and/or of current flow or resistance measurements based on thereon.

Connector 123 may be implemented in various ways to receive, retain and electrically connect the cable 102 to the conductive fluid sensing circuit 121. Preferably, the connector 123 allows a cable 102 to be inserted, and then later removed, to allow the cable to be easily installed and replaced without needing to open the housing of the conductive fluid sensing circuit 121 and/or solder the connections.

Figure 12A:
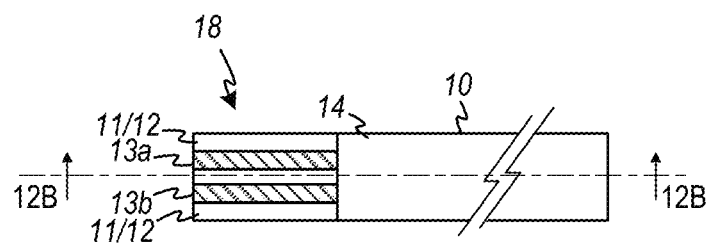
FIG. 12A is an orthogonal view looking at the cover face of the first embodiment cable of FIG. 2A, illustrating an embodiment of a terminating end for the cable.
Figure 12B:
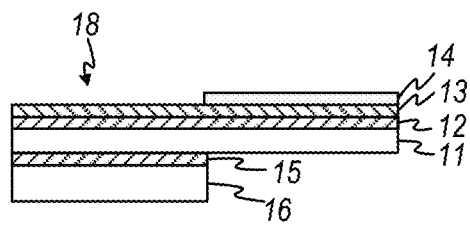
FIG. 12B is a cross-sectional view of the terminating end of the first embodiment cable of FIG. 2A along the line 2C-2C looking in the direction of the arrows.

In an embodiment the connector 123 comprises a zero-insertion force (ZIF) connector that is configured to receive an FFC cable. In such embodiment, the terminating end of the cable to be inserted into the ZIF connector will typically require a stiffener added to the end of the cable. FIGS. 12A and 12B depict an example terminating end 18 of a cable that may be implemented on the end of, for example, the cable 10 from FIGS. 2A-2D. As illustrated in FIG. 12B, a terminating end 18 of cable 10 may include a stiffener 16 adhered with adhesive 15 on the underside of the substrate 11 at the terminal end 18 of the cable. Additionally, the cover 14 does not extend fully to the terminating end 18 in order to expose the conductors 13a, 13b for connection to the conductive terminals of the ZIF connector (not shown). In an embodiment, the stiffener 16 preferably comprises support tape such as polyethylene terephthalate (PET) or polyethylene naphthalate (PEN).

In a preferred embodiment, the connector 123 is integrated into the circuitry and housing of the conductive fluid sensing circuit 121 and includes features that allow an end of a cable 20 to be inserted into and retained by the connector 123 whereby the connector forms an electrical connection between conductors 103a, 103b of the cable 102 and the connector input nodes 122a, 122b of the conductive fluid sensing circuit 121. Preferably, the connector 123 is self-contained and requires no external crimping tool to electrically connect the cable 102 to the circuit 121. Preferably, the connector 123 also does not require any additional termination structure or support on the end of the cable—for example, the connector connects to a raw end of a cable wherein the raw end of the cable does not include any additional stiffener, connector, or other structure.

FIGS. 12A-12L illustrate an exemplary embodiment 200 of a connector 123 that can be used to connect a cable 2 to the conductive fluid sensing circuit 121, and can be used to attach to a raw end of the cable (i.e., no additional connector, terminating stiffener or other structure implemented on the end of the cable), thus allowing a conductive fluid sensor cable to be cut to any length and immediately used without having to add an additional interface to attach to the connector 123.

FIG. 13A is a plan view showing the connector 200 attached to the sensing circuit 121. As best seen in FIG. 13C, the connector 200 comprises a body 201 having a channel 202 for receiving an end 105 of a cable 102. The channel 202 includes a planar base section 204 and a pair of perpendicular sidewalls 203a, 203b situated one on each side of the planar base section 204. The interior width (inside channel 202) of the planar base section 204 is substantially the width of the cable 102 plus a small relative tolerance to allow for loose insertion and fit, yet snug enough that a cable 102 being inserted therein is naturally guided by, and substantially centered between, the sidewalls 203a, 203b of the channel 202. The channel 202 of the housing 201 includes a pair of conductive rails 206a, 206b seated or otherwise embedded on the planar base section 204. The spacing of the conductive rails 206a, 206b is such that respective rails 206a, 206b each align with respective conductors 103a, 103b of the cable 2 when the cable 102 is inserted into the connector channel 202. In other words, the spacing and pitch of the rails 206a, 206b substantially matches the spacing and pitch of the conductors 103a, 103b on the cable 102. Each conductive rail 206a, 206b includes a plurality of piercing protrusions 207 which protrude outwardly from its respective rail and into the space defined by the channel 202. In an embodiment, the piercing protrusions 207 each comprise a smooth base section 208 oriented towards the entrance of the channel and at least one piercing tip 209 oriented towards the rear of the channel 202. This allows a cable to slide along the smooth base sections 208 of the protrusions 207 yet not be pierced by the piercing protrusions 207 when the cable is being inserted, allowing for easy installation.

As best seen in FIGS. 13B and 13C, the planar base section 204 may also include one or more retainer protrusions 210, which may be formed on the planar base section 208 of the molded connector body, or alternatively may be seated or otherwise embedded in one or more of the areas of the planar base section 208 that is not occupied by the conductive rails 206a, 206b. In an embodiment, the retainer protrusions 210 are piercing pins that will pierce non-conductive portions of the cable 102 when an end of the cable 102 is inserted into the channel 202 and the retention cover 211 (discussed below) is seated thereover. In an embodiment, the retainer protrusions 210 also are characterized by a smooth base section and oriented with the smooth sections toward the entrance of the channel. Alternatively, the retainer protrusions 210 do not protrude as far from the surface of the planar base section 204 as do the piercing protrusions 207 of the conductive rails 206a, 206b, as best seen in FIG. 13B. In this manner, the retainer protrusions 207 do not interfere with the insertion of the cable 201 into the channel 202 during the insertion of the cable 102.

The connector 200 also comprises a retention cover 211 having attached or molded on its underside a molded compression block 212 that includes cavities or indentations 213 positioned to substantially conform to the respective positions of the piercing protrusions 207 and retainer protrusions 210 in the channel 202 when the retention cover 211 is property seated over the channel 202. In an embodiment, the retention cover 211 is attached along the upper edge of one sidewall 203a of the channel 202 by a hinge 213, which allows the cover 211 to be rotated from an open position (FIG. 13D) to a closed position (FIG. 13E). The retention cover 211 further comprises a retention clip 214. In an embodiment, the retention clip 214 is molded into the cover 211 on the edge opposite the hinge 213. The retention clip 214 comprises a hooked edge 215 which mates with a complementary hooked edge 216 formed within the outer surface of the non-hinged sidewall 203b.

Figure 13F:
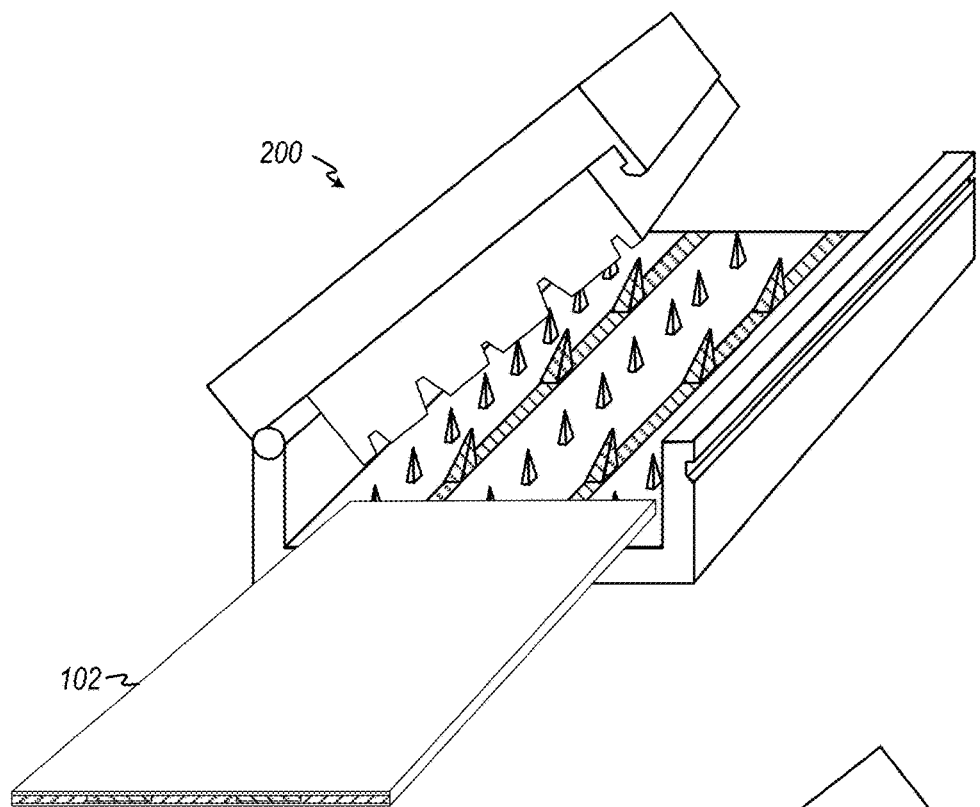
Figure 13G:
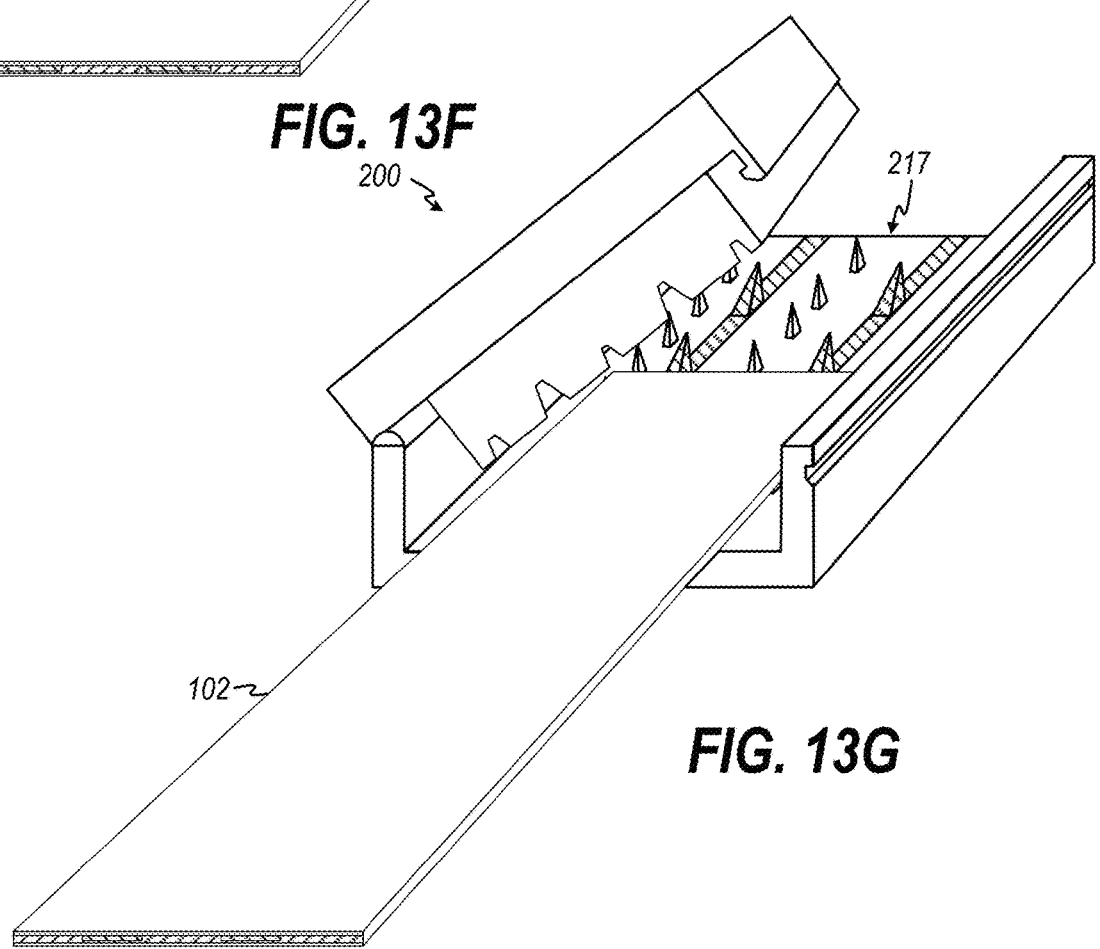

Thus, with reference to FIGS. 13F-13L, in operation, with the retention cover 211 in an open position, a cable 102 is placed at the entrance of the connector channel 202 (FIG. 13F), and then slid toward the rear 217 of the channel 202 (FIG. 13G) until it contacts the rear 217 of the channel 202 (FIG. 13H). The retention cover 211 is then rotated into a closed position FIG. 12I. As the retention cover 211 rotates into the closed position, the compression block 212 contacts the cable 102 and exerts pressure onto the surface of the cable 102, which in turn presses the opposite surface of the cable 102 onto the piercing protrusions 207 of the rails 203a, 203b and retention protrusions 210 of the channel. As best seen in FIGS. 13J-13L, as the retention cover is rotated fully into place, the piercing protrusions 207 of the rails 203a, 203b pierce through the substrate 211, conductors 212 and cover 214 (and adhesive (not shown)) of the cable 102. In particular, the piercing protrusions 207 pierce the conductors 103a, 103b of the cable 102, thereby forming an electronic connection between the cable conductors 103a, 103b and input nodes 122a, 122b of the circuit 121 (note, input nodes 122a, 122b of the circuit 121 are electrically connected to the rails 203a, 203b). Similarly, the retention protrusions 210 pierce the cable 102 in areas where the conductors 213a, 213b are not located, thereby forming a retaining hold on the cable 102 so that it is held securely in place within the channel 202 of the connector 200.

In alternative embodiments, the retention cover 211 is a modular piece that is snapped on and held by retention clips.

Referring again to FIG. 10, driving signal(s) D present on driving signal node(s) 124 may be advantageously used to drive subsequent circuitry. For example, in an embodiment, driving signal(s) D on node(s) 124 drives one or more input(s) of a processor 120 which drives other circuits to effectuate various actions based on state of the driving signal(s) D output (on node(s) 124) by the conductive fluid sensing circuit 121. The processor 120 may be, by way of example and not limitation, a central processing unit (CPU), a microprocessor, Application Specific Integrated Circuit (ASIC), a programmable logic array (PLA), etc. The processor 120 may be connected via a bus (not shown) to computer memory 127 such that the processor 120 can access programming instructions and/or data stored in the memory 127. By way of example and not limitation, memory 127 may be one or more of RAM, ROM, PROM, FPROM, FEPROM, or any other suitable computer-readable storage memory or component now known or hereinafter developed. Driving signal D from the conductive fluid sensing circuit 121 may drive, directly or indirectly (for example, via processor 120 as shown in FIG. 10, or through additional circuitry (not shown)) one or more alarm devices/circuits, such as an audio alarm 128, a visual alarm such as lighting LED or other light(s) 129 or displaying text or graphics on a display 130. The driving signal D present on driving signal node 124 may further be used, directly or indirectly, to actuate automatic shut off valves and/or control relays 131.

Actuation of any of the devices 128, 129, 130, 131 may be effectuated directly by direct electrical connection of node 124 to an input of a respective actuation device 128, 129, 130, 131. Alternatively, actuation may be effectuated indirectly by way of one or more intermediate circuits, electrical devices, controls and/or network communication(s). For example, in FIG. 10, actuation device 128, 129, 130, 131 are each controlled by processor 120 which actuates such respective device(s) in response to the state of the driving signal(s) D on node 124. In an embodiment, actuation of devices 128, 129, 130, 131 may further be based on input from one or more other sensor(s) 134, including without limitation sensor(s) which detect temperature, humidity, location, etc. In an alternative embodiment, the driving signal(s) D on node(s) 124 could be connected directly to one or more of actuation devices 128, 129, 130, 131 to effect direct actuation of such device(s).

Processor 120 may further be configured to control one or more transmission module(s) 132 in order to transmit an alert such as a text message, a phone call, an email, etc. Transmission module(s) 132 send information indicating the presence (or lack of presence) of conductive fluid across the conductors 103a, 103b of the conductive fluid sensor cable 102, and/or current and/or resistance measurements base thereon. In embodiments, the transmission module(s) 132 comprise one or more of a cellular modem and antenna, an IEEE 802.11 b/g/n WiFi module with antenna, or an RF transceiver and antenna that implements transmission protocols in other RF bands and corresponding suitable transmission protocols (e.g., 433 MHz serial protocol, Bluetooth, Zigbee, etc.). The conductive fluid sensing system 100 may further include additional circuitry, such as but not limited to a Subscriber Identity Module (SIM) card 135 for use with a cellular transmission module, a GPS module 133 for detection and use or transmission of GPS coordinates, other sensors 134 such as temperature, humidity sensors, etc. The system 100 includes one or more power sources 136. In an embodiment, the system 100 is self-powered using one or more battery source(s). Alternatively, the power source 136 may comprise an AC/DC converter and connect to AC power via an AC power outlet connected to the power grid or other AC source.

Figure 14:
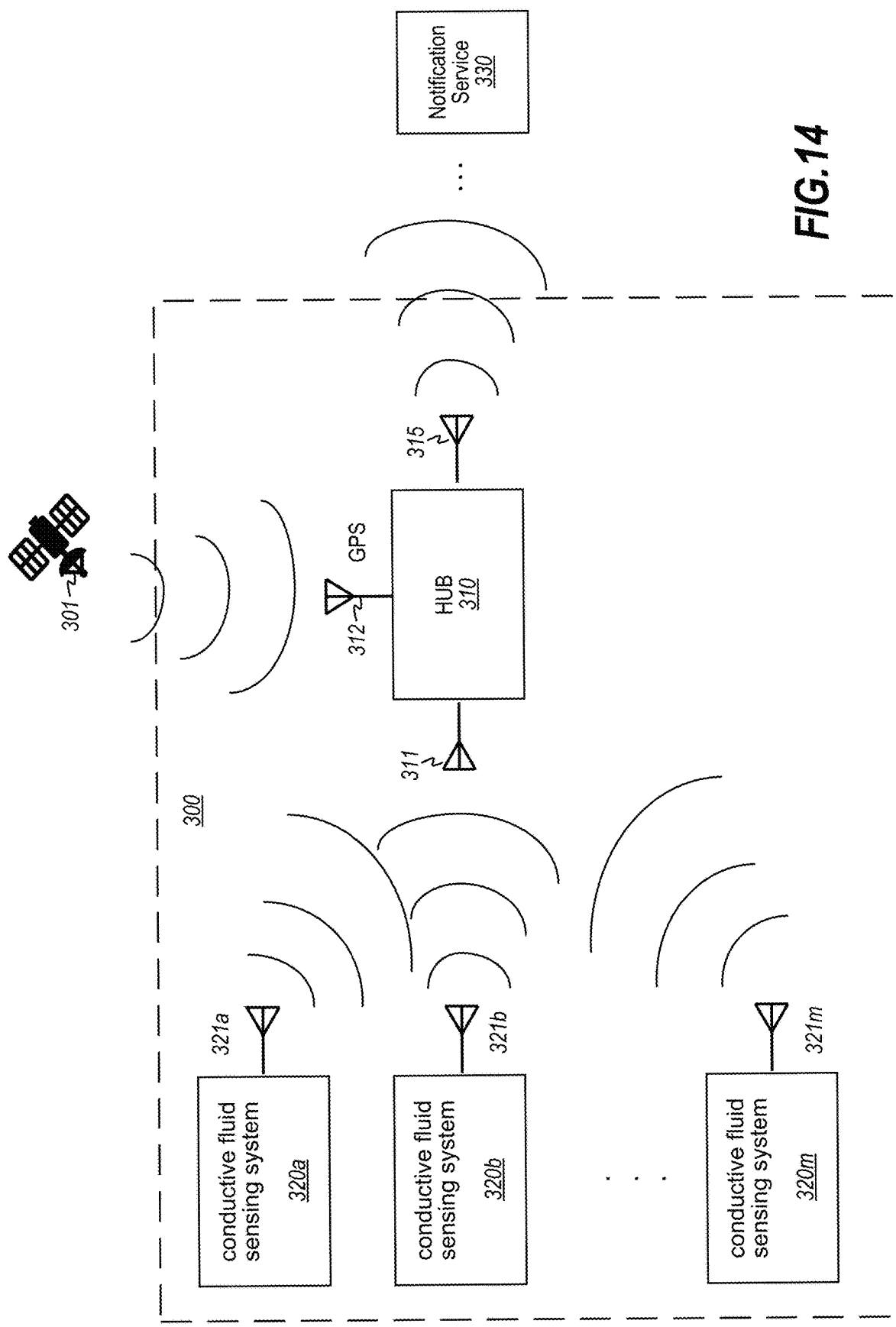
FIG. 14 is a system diagram illustrating an embodiment of a conductive fluid sensing and notification system.

With reference to FIG. 14, in an embodiment, the conductive fluid sensor cable 2 may be used in connection with a water sensor alert notification system. In an embodiment, one or more conductive fluid sensing systems 320a, 320b, 320m including conductive fluid sensor cables attached thereto (such as individual systems 100 of FIG. 10 with cable 102 attached thereto) are installed in an environment 300. If and when a conductive fluid sensing system 320a, 320b, 320m is triggered due to the detection of conductive fluid on its respective connected cable, the respective system 320a, 320b, 320m formulates a message and transmits to a communications hub 310. The communications hub 310 receives the message and sends a corresponding message to a Notification Service 330 executing on an Internet-enabled computer (such as in the Cloud), which further notifies a user via an in-App notification on a mobile device, a text message, an email, a phone call, etc. In an embodiment, the sensing systems 320a, 320b, 320m each comprise an antenna 321a, 321b, 321c tuned to transmit messages using a local protocol such as 433 MHz, BlueTooth, Zigbee, or WiFi. The hub 310 includes a local range antenna to receive messages from the sensing systems 320a, 320b, 320m and further includes a long-range antenna for transmitting messages to a remote notification service 330. In an embodiment, the long-range antenna and transmission modules implement one or more mid- and/or long-range protocols including WiFi, cellular (such as LTE, LTE-CAT-M1, LTE-NB-IoT, etc.), and other Internet Protocols. The transmission may further actuate other electrical and/or mechanical devices such as automatic water shutoff valves, relays, and other mechanical controls.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, it should be understood that the term "connected", as used in both the specification and the claims includes any direct or indirect electrical connection herein known or hereinafter developed. It is also possible that other benefits or uses of the currently disclosed invention will become apparent over time.

What is claimed is:

1. A conductive fluid sensor cable, comprising: a substrate having an adhesive surface and extending in an extension direction; a material overlaying and substantially covering the substrate adhesive surface; and first and second uninsulated flat conductors, each having a first surface and an opposite-facing second surface, each laterally positioned in electrical isolation from one another along a single layer between the substrate and the material, and each extending along the adhesive surface of the substrate in the extension direction; wherein the substrate, the first and second uninsulated flat conductors and the material are laminated together by way of at the substrate adhesive surface, wherein the respective first surfaces of the first and second uninsulated flat conductors adhere to the adhesive surface of the substrate and the material adheres to one or more exposed areas of the adhesive surface of the substrate, thereby forming a laminated structure that seals the first and second uninsulated flat conductors between the substrate and the material and secures the first and second uninsulated flat conductors in a fixed position within the laminated structure, wherein the material directly covers and contacts the respective second surfaces of the first and second uninsulated flat conductors; wherein the material comprises a plurality of microdots disposed over the adhesive surface of the substrate and the respective second surfaces of the first and second uninsulated flat conductors; the plurality of microdots form voids therebetween and, in the presence of conductive fluid, said voids permits conductive fluid to penetrate the material to form a conductive fluid path between the first and second uninsulated flat conductors.

2. The cable of claim 1, therein the laminated structure is flexible.

3. The cable of claim 1, wherein the laminated structure is characterized by a total thickness of less than 0.2 mm.

4. The cable of claim 1, wherein the substrate comprises a fluid-permeable material.

5. The cable of claim 1, wherein the substrate adhesive surface comprises a B-stage adhesive.

6. The cable of claim 1, wherein the substrate comprises a polyester material.

7. The cable of claim 1, wherein the substrate comprises a polyimide material.

8. The cable of claim 1, wherein the substrate is a tape having a polyester film with an adhesive applied thereon.

9. The cable of claim 8, wherein the tape adhesive is a B-stage adhesive.

10. The cable of claim 1, wherein the substrate is a tape having a polyimide film with an adhesive applied thereon.

11. The cable of claim 10, wherein the tape adhesive is a B-stage adhesive.

12. The cable of claim 1, the first and second uninsulated flat conductors electrically connected to first and second inputs of a conductive fluid sensing circuit, the sensing circuit generating a signal indicative of a presence or a lack of presence of the conductive fluid across the first and second uninsulated flat conductors based on amount of current or resistance detected between the sensing circuit first and second inputs.

13. The cable of claim 1, the first and second uninsulated flat conductors electrically connected to first and second connector nodes of a cable connector, the cable connector configured to connect to a corresponding fluid sensing circuit connector of a fluid sensing circuit, the fluid sensing circuit connector connecting the first and the second connector nodes of the cable connector to respective first and second sensing nodes of the fluid sensing circuit.

14. The cable of claim 13, the cable connector connected to the fluid sensing circuit connector of the fluid sensing circuit, the fluid sensing circuit generating a signal indicative of a presence or a lack of presence of the conductive fluid across the first and second uninsulated flat conductors based on a value of current or resistance detected between the first and second sensing nodes of the fluid sensing circuit.

15. The cable of claim 1, wherein the substrate adhesive surface comprises a continuous body of adhesive.

* * * * *